US012784263B2

(12) United States Patent
Jin et al.

(10) Patent No.: US 12,784,263 B2
(45) Date of Patent: Nov. 3, 2026

(54) USING A MACHINE LEARNING TECHNIQUE TO PERFORM DATA ASSOCIATION OPERATIONS FOR POSITIONS OF POINTS THAT REPRESENT OBJECTS IN IMAGES OF A LOCATION

(71) Applicant: Woven by Toyota, Inc., Tokyo (JP)

(72) Inventors: Hai Jin, Fremont, CA (US); Paul J. Ozog, Ann Arbor, MI (US); Jeffrey M. Walls, Mountain View, CA (US)

(73) Assignee: Woven By Toyota, Inc., Tokyo (JP)

( * ) Notice: Subject to any disclaimer, the term of this patent is extended or adjusted under 35 U.S.C. 154(b) by 255 days.

(21) Appl. No.: 18/484,781

(22) Filed: Oct. 11, 2023

(65) Prior Publication Data

US 2025/0124594 A1 Apr. 17, 2025

(51) Int. Cl.
*G06T 7/73* (2017.01)
*G01C 21/00* (2006.01)

(52) U.S. Cl.
CPC ............ *G06T 7/73* (2017.01); *G01C 21/3807* (2020.08); *G01C 21/3841* (2020.08);
(Continued)

(58) Field of Classification Search
CPC ............. G06T 7/73; G06T 2207/20081; G06T 2207/20084; G06T 2207/30244;
(Continued)

(56) References Cited

U.S. PATENT DOCUMENTS

| | | |
|---|---|---|
| 11,354,913 B1 | 6/2022 | Houston et al. |
| 11,506,500 B2 | 11/2022 | Zhang et al. |

(Continued)

FOREIGN PATENT DOCUMENTS

| | | | |
|---|---|---|---|
| JP | 2023143663 | * 10/2023 | ............. A61B 5/055 |
| WO | 2022174198 | 3/2021 | |
| WO | 2021153176 A1 | 8/2021 | |

OTHER PUBLICATIONS

Bittel et al. "Estimating high definition map parameters with convolutional neural networks". (Oct. 2017) IEEE International Conference on Systems, Man, and Cybernetics (SMC) (pp. 52-56). IEEE.

(Continued)

*Primary Examiner* — Jerome Grant, II
(74) *Attorney, Agent, or Firm* — Christopher G. Darrow; Darrow Mustafa PC

(57) ABSTRACT

A system for using a machine learning technique to perform data association operations for positions of points that represent objects in images of a location can include a machine learning module, a production module, and a communications module. The machine learning module can, while operating the machine learning technique, receive information and produce results of the data association operations. The information can: (1) include: (a) the positions of the points that represent the objects in the images of the location, (b) semantic information affiliated with the objects, and (c) a pose of a camera that produced the images, but (2) exclude a depiction of any of the objects. The production module can produce, based on the results, a digital map of the location. The communications module can transmit the digital map to a specific vehicle to be used to control a movement of the specific vehicle.

20 Claims, 18 Drawing Sheets

1500

(52) U.S. Cl.
CPC ............... *G06T 2207/20081* (2013.01); *G06T 2207/20084* (2013.01); *G06T 2207/30244* (2013.01); *G06T 2207/30252* (2013.01)

(58) Field of Classification Search
CPC ...... G06T 2207/30252; G01C 21/3807; G01C 21/3841; G01C 21/3602
USPC .......................................................... 382/104
See application file for complete search history.

(56) References Cited

U.S. PATENT DOCUMENTS

2020/0098135 A1 3/2020 Ganjineh et al.
2023/0147722 A1* 5/2023 Ramirez de Chanlatte ................ G06N 3/0442 345/419

OTHER PUBLICATIONS

Peng et al. "RWT-SLAM: Robust visual SLAM for highly weak-textured environments." arXiv preprint arXiv:2207.03539 (2022).
Ghallabi et al. "Lidar-based lane marking detection for vehicle positioning in an hd map." 2018 21st International Conference on Intelligent Transportation Systems (ITSC). IEEE, 2018.
Levinson et al. "Robust vehicle localization in urban environments using probabilistic maps." 2010 IEEE international conference on robotics and automation. IEEE, 2010.
Wenzel et al. "4Seasons: A cross-season dataset for multi-weather SLAM in autonomous driving." Pattern Recognition: 42nd DAGM German Conference, DAGM GCPR 2020, Tübingen, Germany, Sep. 28-Oct. 1, 2020, Proceedings 42. Springer International Publishing, 2021.
Yang et al. "HDNET: Exploiting HD Maps for 3d Object Detection." Conference on Robot Learning. PMLR, 2018.
Poiesi et al. "Distinctive 3D local deep descriptors." 2020 25th International conference on pattern recognition (ICPR). IEEE, 2021.
Wikipedia, "Correspondence problem", Retrieved from the Internet: <https://en.wikipedia.org/wiki/Correspondence_problem>, retrieved Sep. 10, 2023 (3 pages).
Wikipedia, "Siamese neural network", Retrieved from the Internet: <https://en.wikipedia.org/wiki/Siamese_neural_network>, retrieved Sep. 11, 2023 (4 pages).
Younes et al., "Keyframe-based monocular SLAM: design, survey, and future directions," Robotics and Autonomous Systems, vol. 98, pp. 67-88, Dec. 2017.
Carlevaris-Bianco et al., "Learning Visual Feature Descriptors for Dynamic Light Conditions," 2014 IEEE/RSJ International Conference on Intelligent Robots and Systems, pp. 2769-2776, 2014.
Klein et al., "Parallel Tracking and Mapping for Small AR Workspaces," IEEE and ACM International Symposium on Mixed and Augmented Reality, pp. 225-234, Dec. 2007.
Xie et al., "PointContrast: Unsupervised Pre-training for 3D Point Cloud Understanding," found at https://arxiv.org/abs/2007.10985, last revised Nov. 21, 2020.
Lang et al., "PointPillars: Fast Encoders for Object Detection from Point Clouds," 2019 IEEE/CF Conference on Computer Vision and Pattern Recognition, pp. 12689-12697, 2018.
Strasdat et al., "Scale Drift-Aware Large Scale Monocular SLAM," Robotics: Science and Systems, 2010.
Tang et al., "Self-Supervised 3D Keypoint Learning for Ego-Motion Estimation," found at https://arxiv.org/abs/1912.03426, last revised Nov. 18, 2020.
Pillai et al., "Self-Supervised Visual Place Recognition Learning in Mobile Robots," found at https://arxiv.org/abs/1905.04453, submitted May 11, 2019.
Zhang et al., "Global Data Association for Multi-Object Tracking Using Flow Networks," 2008 IEEE Computer Society Conference on Computer Vision and Pattern Recognition (8 pages).
McGann et al., "Robust Incremental Smoothing and Mapping (riSAM)," Retrieved from the Internet: https://arxiv.org/abs/2209.14359, Sep. 28, 2022.
Brachmann et al., "On the Limits of Pseudo Ground Truth in Visual Camera Re-localisation," Retrieved from the Internet: https://arxiv.org/abs/2109.00524, Sep. 1, 2021.
Wei et al., "Smooth Localization Independent of GPS Using Coarse Height Maps," 2015 CCDC The 27th Chinese Control and Decision Conference, pp. 3987-3992, 2015.
Chen et al., "SLAM Overview: From Single Sensor to Heterogeneous Fusion," Remote Sensing, vol. 14, No. 23, pp. 6033-6085, Oct. 16, 2022.
Li et al., "Towards Streaming Perception," Computer Vision—ECCV 2020, pp. 473-488, Nov. 2020.
Ghallabi et al., "LIDAR-Based Lane Marking Detection For Vehicle Positioning in an HD Map," 2018 IEEE International Conference on Intelligent Transportation System (ITSC), Nov. 2018.
Tschopp et al., "Experimental Comparison of Visual-Aided Odometry Methods for Rail Vehicles," IEEE Robotics and Automation Letters, vol. 4, No. 2, pp. 1815-1822, Apr. 2019.

* cited by examiner

600

602

| | |
|---|---|
| 614 | camera: (latitude: 37.441889, longitude: -122.142913, altitude: 10.61), (roll: 2.64 degrees, pitch: 1.95 degrees, yaw: +3.13 degrees) |
| 402 | sign_type:_slow, sign_center: (latitude: 37.441907, longitude: -122.143097, altitude: 13.59), sign_width: 1.07m, sign_height: 1.07m) |
| 404 | sign_type:_slow, sign_center: (latitude: 37.442206, longitude: -122.142681, altitude: 13.59), sign_width: 1.07m, sign_height: 1.07m) |
| 406 | road_boundary: (latitude: 37.442056, longitude: -122.142973, altitude: 9.09) |
| 408 | road_boundary: (latitude: 37.442056, longitude: -122.142893, altitude: 9.09) |
| 410 | lane_boundary: (latitude: 37.442056, longitude: -122.142933, altitude: 9.09) |

$t_1$

604

| | |
|---|---|
| 616 | camera: (latitude: 37.442174, longitude: -122.142727, altitude: 10.67), (roll: 3.17 degrees, pitch: 2.58 degrees, yaw: +3.29 degrees) |
| 404 | sign_type: slow, sign_center: (latitude: 37.442206, longitude: -122.142681, altitude: 13.59), sign_width: 1.07m, sign_height: 1.07m) |
| 502 | sign_type: slow, sign_center: (latitude: 37.442505, longitude: -122.142265, altitude: 13.59), sign_width: 1.07m, sign_height: 1.07m) |
| 504 | road_boundary: (latitude: 37.442355, longitude: -122.142557, altitude: 9.15) |
| 506 | road_boundary: (latitude: 37.442355, longitude: -122.142477, altitude: 9.15) |
| 508 | lane_boundary: (latitude: 37.442355, longitude: -122.142517, altitude: 9.15) |

$t_2$

FIG. 6A

600

606

| | |
|---|---|
| 618 | camera: (latitude: 37.441889, longitude: -122.142926, altitude: 10.57), (roll: 4.36 degrees, pitch: 3.85 degrees, yaw: -3.36 degrees) |
| 402 | sign_type:_slow, sign_center: (latitude: 37.441907, longitude: -122.143110, altitude: 13.55), sign_width: 1.07m, sign_height: 1.07m) |
| 404 | sign_type:_slow, sign_center: (latitude: 37.442206, longitude: -122.142694, altitude: 13.55), sign_width: 1.07m, sign_height: 1.07m) |
| 406 | road_boundary: (latitude: 37.442056, longitude: -122.142986, altitude: 9.05) |
| 408 | road_boundary: (latitude: 37.442056, longitude: -122.142906, altitude: 9.05) |
| 410 | lane_boundary: (latitude: 37.442506, longitude: -122.142946, altitude: 9.05) |

$t_3$

608

| | |
|---|---|
| 620 | camera: (latitude: 37.442174, longitude: -122.142740, altitude: 10.63), (roll: 3.47 degrees, pitch: 2.84 degrees, yaw: -3.13 degrees) |
| 404 | sign_type:_slow, sign_center: (latitude: 37.442206, longitude: -122.142694, altitude: 13.61), sign_width: 1.07m, sign_height: 1.07m) |
| 502 | sign_type:_slow, sign_center: (latitude: 37.442505, longitude: -122.142278, altitude: 13.61), sign_width: 1.07m, sign_height: 1.07m) |
| 504 | road_boundary: (latitude: 37.442355, longitude: -122.142570, altitude: 9.11) |
| 506 | road_boundary: (latitude: 37.442355, longitude: -122.142490, altitude: 9.11) |
| 508 | lane_boundary: (latitude: 37.442355, longitude: -122.142530, altitude: 9.11) |

$t_4$

FIG. 6B

600

610

| | |
|---|---|
| 622 | camera: (latitude: 37.441880, longitude: -122.142900, altitude: 10.67), (roll: 1.94 degrees, pitch: 2.73 degrees, yaw: +1.26 degrees) |
| 402 | sign_type: slow, sign_center: (latitude: 37.441898, longitude: -122.143084, altitude: 13.51), sign_width: 1.07m, sign_height: 1.07m) |
| 404 | sign_type: slow, sign_center: (latitude: 37.442197, longitude: -122.142668, altitude: 13.51), sign_width: 1.07m, sign_height: 1.07m) |
| 406 | road_boundary: (latitude: 37.442047, longitude: -122.142960, altitude: 9.15) |
| 408 | road_boundary: (latitude: 37.442047, longitude: -122.142880, altitude: 9.15) |
| 410 | lane_boundary: (latitude: 37.442047, longitude: -122.142920, altitude: 9.15) |

$t_5$

612

| | |
|---|---|
| 624 | camera: (latitude: 37.442165, longitude: -122.142714, altitude: 10.61), (roll: 2.58 degrees, pitch: 1.88 degrees, yaw: +1.74 degrees) |
| 404 | sign_type:_slow, sign_center: (latitude: 37.442197, longitude: -122.142668, altitude: 13.57), sign_width: 1.07m, sign_height: 1.07m) |
| 502 | sign_type:_slow, sign_center: (latitude: 37.442496, longitude: -122.142252, altitude: 13.57), sign_width: 1.07m, sign_height: 1.07m) |
| 504 | road_boundary: (latitude: 37.442346, longitude: -122.142544, altitude: 9.09) |
| 506 | road_boundary: (latitude: 37.442346, longitude: -122.142464, altitude: 9.09) |
| 508 | lane_boundary: (latitude: 37.442346, longitude: -122.142504, altitude: 9.09) |

$t_6$

FIG. 6C

1000

| | POS 742 | POS 744 | POS 746 | POS 748 | POS 750 |
|---|---|---|---|---|---|
| POS 722 | LESS | GREATER | GREATER | GREATER | GREATER |
| POS 724 | GREATER | LESS | GREATER | GREATER | GREATER |
| POS 726 | GREATER | GREATER | LESS | GREATER | GREATER |
| POS 728 | GREATER | GREATER | GREATER | LESS | GREATER |
| POS 730 | GREATER | GREATER | GREATER | GREATER | LESS |

FIG. 10

1100

| | FV: (POS 732) | FV: (POS 734) | FV: (POS 736) | FV: (POS 738) | FV: (POS 740) |
|---|---|---|---|---|---|
| FV: (POS 722) | GREATER | GREATER | GREATER | GREATER | GREATER |
| FV: (POS 724) | LESS | GREATER | GREATER | GREATER | GREATER |
| FV: (POS 726) | GREATER | GREATER | LESS | GREATER | GREATER |
| FV: (POS 728) | GREATER | GREATER | GREATER | LESS | GREATER |
| FV: (POS 730) | GREATER | GREATER | GREATER | GREATER | LESS |

FIG. 11

1200

| | SI: (POS 742) | SI: (POS 744) | SI: (POS 746) | SI: (POS 748) | SI: (POS 750) |
|---|---|---|---|---|---|
| SI: (POS 722) | LESS | GREATER | GREATER | GREATER | GREATER |
| SI: (POS 724) | GREATER | LESS | GREATER | GREATER | GREATER |
| SI: (POS 726) | GREATER | GREATER | LESS | GREATER | GREATER |
| SI: (POS 728) | GREATER | GREATER | GREATER | LESS | GREATER |
| SI: (POS 730) | GREATER | GREATER | GREATER | GREATER | LESS |

FIG. 12

1300

| | FV: (POS 742) | FV: (POS 744, POS 752) | FV: (POS 754) | FV: (POS 746, POS 756) | FV: (POS 748, POS 758) | FV: (POS 750, POS 760) |
|---|---|---|---|---|---|---|
| FV: (POS 722) | LESS | GREATER | GREATER | GREATER | GREATER | GREATER |
| FV: (POS 724, POS 732) | GREATER | LESS | GREATER | GREATER | GREATER | GREATER |
| FV: (POS 734) | GREATER | GREATER | LESS | GREATER | GREATER | GREATER |
| FV: (POS 726, POS 736) | GREATER | GREATER | GREATER | LESS | GREATER | GREATER |
| FV: (POS 728, POS 738) | GREATER | GREATER | GREATER | GREATER | LESS | GREATER |
| FV: (POS 730, POS 740) | GREATER | GREATER | GREATER | GREATER | GREATER | LESS |

FIG. 13

USING A MACHINE LEARNING TECHNIQUE TO PERFORM DATA ASSOCIATION OPERATIONS FOR POSITIONS OF POINTS THAT REPRESENT OBJECTS IN IMAGES OF A LOCATION

TECHNICAL FIELD

The disclosed technologies are directed to using a machine learning technique to perform data association operations for positions of points that represent objects in images of a location.

BACKGROUND

A digital map can be an electronic representation of a conventional paper road map. For example, an automotive navigation system can use information received from a digital map and information received from a global navigation satellite system (GNSS) to produce a turn-by-turn navigation service. A turn-by-turn navigation service can provide a route between an origination point and a destination point. A position of a vehicle determined by such a turn-by-turn navigation service can be within a meter of an actual position.

More recently, technologies have been developed to automate one or more operations of one or more vehicle systems to control a movement of a vehicle. Such technologies can use information received from a digital map to control such movement. However, such a digital map can be required to indicate positions of objects with a degree of accuracy that is within a decimeter. Accordingly, development of technologies to automate control of movement of vehicles have been accompanied by efforts to improve the degree of accuracy of digital maps. This has led to the production of high-definition (HD) maps.

An HD map can be a digital map that includes additional information to improve the degree of accuracy required to automate control of a movement of a vehicle. An HD map can be characterized as having layers of additional information. Each layer of additional information can be affiliated with a specific category of additional information. These layers can include, for example, a layer of a base map, a layer of a geometric map, and a layer of a semantic map. The base map, the geometric map, and the semantic map can include information about static aspects of a location.

The geometric map can be produced, for example, using a simultaneous localization and mapping (SLAM) technique. A SLAM technique can use proprioception information to estimate a pose (i.e., a position and an orientation) of a vehicle, and perceptual information to correct an estimate of the pose. Usually, the proprioception information can be one or more of GNSS information, inertial measurement unit (IMU) information, odometry information, or the like. For example, the odometry information can be a value included in a signal sent to a vehicle system (e.g., an accelerator). The perceptual information can often be one or more of point cloud information from a ranging sensor (e.g., a light detection and ranging (lidar) system), image data from one or more images from one or more image sensors or cameras, or the like. The geometric map can include, for example, a ground map of improved surfaces for use by vehicles and pedestrians (e.g., drivable surfaces (e.g., roads)), and voxelized geometric representations of three-dimensional objects at the location.

The semantic map can include semantic information about objects included at the location. The objects can include, for example, landmarks. A landmark can be, for example, a feature that can be easily re-observed and distinguished from other features at the location. The term landmark, in a context of indicating positions of objects with a degree of accuracy that is within a decimeter, can be different from a conventional use of the term landmark. For example, landmarks can include lane boundaries, road boundaries, intersections, crosswalks, bus lanes, parking spots, signs, signs painted on roads, traffic lights, or the like.

Because an HD map can be used to localize a vehicle, which can be performed to control a movement of the vehicle, not only do positions of objects need to be indicated on the HD map with a high degree of accuracy, but also the HD map can be required to be updated at a high rate to account for changes in objects or positions of objects expected to be indicated on the HD map.

SUMMARY

In an embodiment, a system for using a machine learning technique to perform data association operations for positions of points that represent objects in images of a location can include a processor and a memory. The memory can store a machine learning module, a production module, and a communications module. The machine learning module can include instructions that, when executed by the processor operating the machine learning technique, cause the processor to receive information and produce results of the data association operations for the positions of the points. The information can: (1) include: (a) the positions of the points that represent the objects in the images of the location, (b) semantic information affiliated with the objects, and (c) a pose of a camera that produced the images, but (2) exclude a depiction of any of the objects. The production module can include instructions that, when executed by the processor, cause the processor to produce, based on the results, a digital map of the location. The communications module can include instructions that, when executed by the processor, cause the processor to transmit the digital map to a specific vehicle to be used to control a movement of the specific vehicle.

In another embodiment, a method for using a machine learning technique to perform data association operations for positions of points that represent objects in images of a location can include receiving, by a processor operating the machine learning technique, information. The information can: (1) include: (a) the positions of the points that represent the objects in the images of the location, (b) semantic information affiliated with the objects, and (c) a pose of a camera that produced the images, but (2) exclude a depiction of any of the objects. The method can include producing, by the processor operating the machine learning technique, results of the data association operations for the positions of the points. The method can include producing, by the processor and based on the results, a digital map of the location. The method can include transmitting, by the processor, the digital map to a specific vehicle to be used to control a movement of the specific vehicle.

In another embodiment, a non-transitory computer-readable medium for using a machine learning technique to perform data association operations for positions of points that represent objects in images of a location can include instructions that, when executed by one or more processors, cause the one or more processors to receive, while operating the machine learning technique, information. The information can: (1) include: (a) the positions of the points that represent the objects in the images of the location, (b)

semantic information affiliated with the objects, and (c) a pose of a camera that produced the images, but (2) exclude a depiction of any of the objects. The non-transitory computer-readable medium can include instructions that, when executed by the one or more processors, cause the one or more processors to produce, while operating the machine learning technique, results of the data association operations for the positions of the points. The non-transitory computer-readable medium can include instructions that, when executed by the one or more processors, cause the one or more processors to produce, based on the results, a digital map of the location. The non-transitory computer-readable medium can include instructions that, when executed by the one or more processors, cause the one or more processors to transmit the digital map to a specific vehicle to be used to control a movement of the specific vehicle.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

FIGS. 6A-6C include an example of tables that illustrate data affiliated with the images of the location, according to the disclosed technologies.

FIG. 10 includes a table that illustrates values of a contrastive loss function between: (1) specific positions of a first set of positions and (2) specific positions of a second set of positions, according to the disclosed technologies.

FIG. 11 includes a table that illustrates values of a contrastive loss function between: (1) feature vectors based on the first set of positions and (2) feature vectors based on the second set of positions, according to the disclosed technologies.

FIG. 12 includes a table that illustrates values of a contrastive loss function between: (1) structural information based on the first set of positions and (2) structural information based on the second set of positions, according to the disclosed technologies.

FIG. 13 includes a table that illustrates values of a contrastive loss function between: (1) feature vectors based on an earlier first set of positions and a later first set of positions and (2) feature vectors based on an earlier second set of positions and a later second set of positions, according to the disclosed technologies.

DETAILED DESCRIPTION

Figure 1:
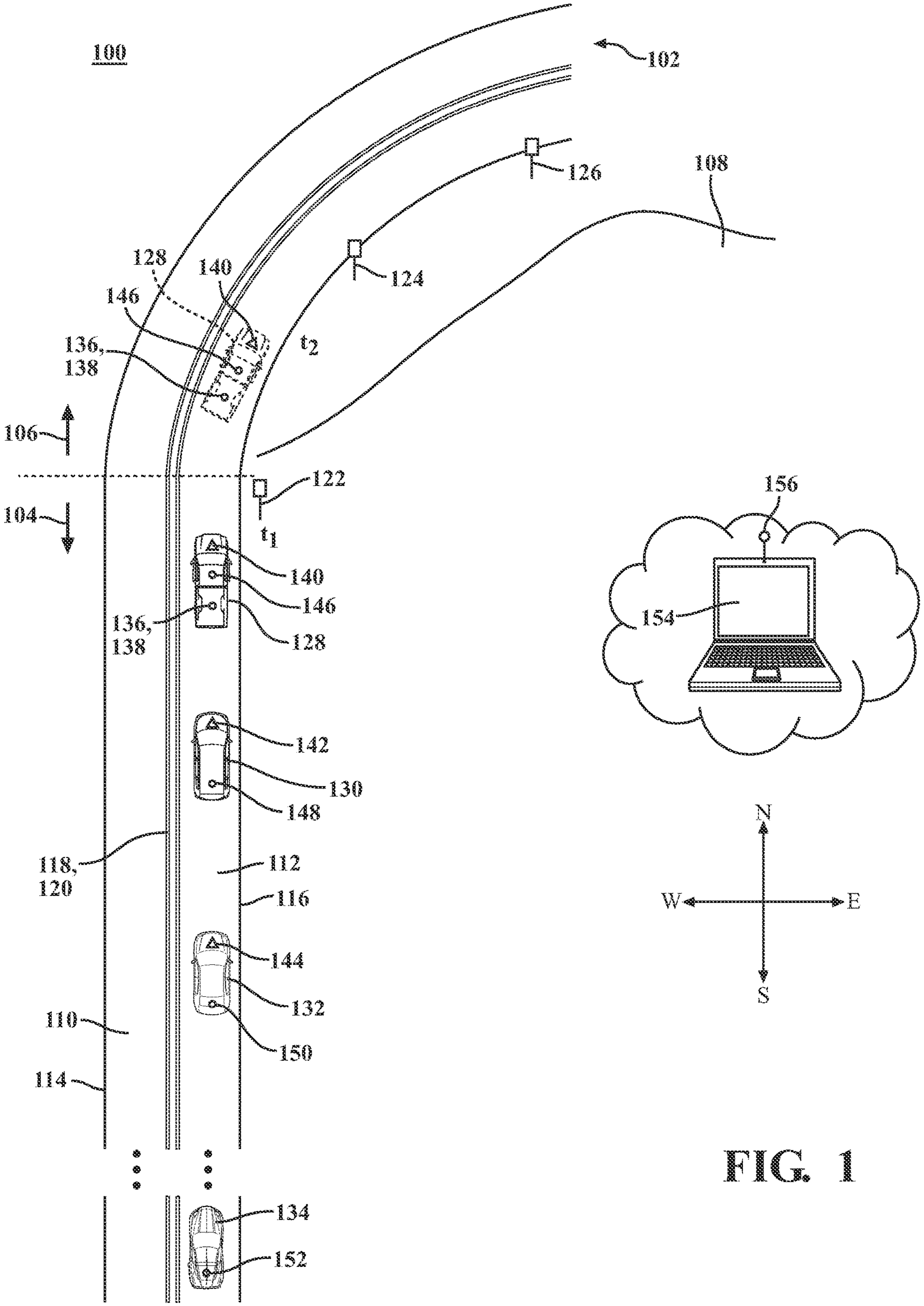
FIG. 1 includes a diagram that illustrates an example of an environment for using a machine learning technique to perform data association operations for positions of points that represent objects in images of a location, according to the disclosed technologies.

Simultaneous localization and mapping (SLAM) is a phrase that can refer to a technology that enables a mobile robot (e.g., an automated vehicle or an autonomous vehicle) to move through an unknown location while simultaneously determining a pose (i.e., a position and an orientation) of the vehicle at the location (i.e., localization) and mapping the location. Typically, a SLAM technique can operate over discrete units of time and use proprioception information to estimate a pose of the vehicle, and perceptual information to correct an estimate of the pose. Usually, the proprioception information can be one or more of global navigation satellite system (GNSS) information, inertial measurement unit (IMU) information, odometry information, or the like. For example, the odometry information can be a value included in a signal sent to a vehicle system (e.g., an accelerator). The perceptual information can often be one or more of point cloud information from a ranging sensor (e.g., a light detection and ranging (lidar) system), image data from one or more images from one or more image sensors or cameras, or the like.

For example, for a SLAM technique that uses point cloud information from a ranging sensor, the ranging sensor can provide the vehicle with distances and bearings to objects in the location and the SLAM technique can operate to identify salient objects as landmarks. For example, for a SLAM technique that uses image data from one or more images from one or more image sensors or cameras, which can be referred to as visual SLAM, distances and bearings to objects can be determined using a photogrammetric range imaging technique (e.g., a structure from motion (SfM) technique) applied to a sequence of two-dimensional images. Because a camera can be less expensive than a lidar device and more vehicles are equipped with cameras than with lidar devices, considerable effort has been expended to develop visual SLAM for use in producing geometric maps as layers of high-definition (HD) maps used to control movements of vehicles.

Moreover, although SLAM techniques were originally developed to operate in real-time (i.e., simultaneously localize and map), the use of SLAM techniques to produce geometric maps has led to the development of SLAM techniques that can operate in a setting other than in a moving vehicle. In such SLAM techniques, recordings of the proprioception information and the perceptual information can be used. Such SLAM techniques can be referred to as offline SLAM. By using the recordings of the proprioception information and the perceptual information, corrections to estimates of poses of a vehicle can be performed concurrently on one or more finite sequences of the discrete units of time over which the SLAM techniques were operated. Such corrections can be realized by various procedures, which can include, for example, one or more techniques for optimization. An optimization can result in more accurate corrections to the estimates of the poses of the vehicle if one or more objects included in the recordings of the perceptual information are included in a plurality of instances of the recordings. (Such a situation can be referred to as closing the loop.) That is, corrections to the estimates of the poses of the vehicle can be more accurate for an optimization in which the same object is included in the recordings of the perceptual information in a plurality of instances than for an optimization in which the same object is not included in the recordings of the perceptual information in a plurality of instances.

The recordings of the proprioception information and the perceptual information can be obtained, for example, by one or more probe vehicles. A probe vehicle can be a vehicle that intentionally performs one or more passes through a location to obtain the recordings of the proprioception information and the perceptual information. Moreover, during each pass, of the one or more passes, a plurality of instances of recordings of the proprioception information and the perceptual information can be obtained. Having: (1) a probe vehicle obtain, during a pass through a location, a plurality of instances of recordings of the proprioception information and the perceptual information, (2) a plurality of probe vehicles pass through a location, or (3) both can increase a likelihood that one or more objects included in the recordings of the perceptual information are included in the plurality of instances of the recordings so that results of an optimization will include a situation of closing the loop.

Because an HD map can be used to localize a vehicle, which can be performed to control a movement of a vehicle, inclusion of indications of certain objects (e.g., landmarks) on the HD map can be more important than others. Such important landmarks can include, for example, lane boundaries, road boundaries, intersections, crosswalks, bus lanes, parking spots, signs, signs painted on roads, traffic lights, or the like. The disclosed technologies are directed to producing, from data affiliated with images of a location, a digital (e.g., HD) map of the location. The digital map can be produced from the data affiliated with the images. The data, for an image of the images, can exclude a depiction of any of the objects, but can include information about: (1) a pose of a camera that produced the image, (2) one or more of a position of a point on: (a) a lane boundary of a lane of a road in the image, (b) a road boundary of the road, or (c) another landmark in the image, and (3) semantic information affiliated with the objects. The digital map can be transmitted to a specific vehicle to be used to control a movement of the specific vehicle.

Additionally, for example, the data affiliated with the images can be received from a set of vehicles (e.g., probe vehicles). A set of cameras can be attached to the set of vehicles. For example, one camera, of the set of cameras, can be attached to one vehicle of the set of vehicles. For example, a camera, of the set of cameras, can produce images. For example, the images can be produced at a specific production rate. For example, the specific production rate can be ten hertz. For example, the camera can be a component in a lane keeping assist (LKA) system. For example: (1) the data affiliated with the images can be received, by a system that implements the disclosed technologies, from the set of vehicles (e.g., the probe vehicles) at a first time, (2) the digital map, produced by the system that implements the disclosed technologies and from the data, can be transmitted to the specific vehicle at a second time, and (3) a difference between the first time and the second time can be less than a specific duration of time. For example, the specific duration of time can be thirty minutes.

The disclosed technologies can produce the data affiliated with the images of the location using, for example, visual SLAM techniques. For example, a camera attached to a vehicle of the set of vehicles (e.g., a probe vehicle) can produce the images. For example, the images can be produced at a specific production rate. For example, the specific production rate can be ten hertz. Objects in the images can be detected using, for example, object detection techniques. Objects in the images can be recognized using, for example, object recognition techniques. Semantic information can be affiliated with the objects. For example, objects that qualify as landmarks can be determined. For example, the landmarks can include lane boundaries, road boundaries, intersections, crosswalks, bus lanes, parking spots, signs, signs painted on roads, traffic lights, or the like.

A lane boundary can separate one lane of a road from another lane of the road. A lane boundary can be indicated, for example, by one or more of road surface markings, observations of differences in pavement on a road, observations of trajectories of vehicles, or the like. The road surface markings for a lane boundary can be, for example, lane markings. The lane markings can be, for example, a series of dashed line segments along the lane boundary.

A road boundary can separate an improved surface for use by vehicles and pedestrians (e.g., a drivable surface (e.g., a road)) from other surfaces. A road boundary can be indicated by one or more of road surface markings, curbs, observations of differences of degrees of improvement between adjacent surfaces, or the like. The road surface markings for a road boundary can be, for example, a continuous line along the road boundary.

Because: (1) positions, not depictions, of landmarks in an HD map used to localize a vehicle, which can be performed to control a movement of a vehicle, need to be indicated with a high degree of accuracy and (2) images of a location can be produced at a specific production rate, depictions of the landmarks likely can be included in several of the images of the location. However, for an image, of the images of the location, a position of any of a lane boundary of a lane of a road in the image, a road boundary of the road, or another landmark in the image can be represented by a position of a point on the lane boundary, the road boundary, or the other landmark. For example, the position of the point on the lane boundary, the road boundary, or the landmark can be affiliated with a position of a keypoint of an object, in the image, that represents the lane boundary, the road boundary, or the landmark. A keypoint can be a point in an object that has a potential of being repeatedly detected under different imaging conditions. Keypoints in objects can be extracted using, for example, keypoint extraction techniques.

The vehicle of the set of vehicles (e.g., the probe vehicle) can use, for example, proprioception information (e.g., one or more of GNSS information, IMU information, odometry information, or the like) to estimate a pose (i.e., a position and an orientation) of a camera (e.g., attached to the vehicle). The vehicle (e.g., the probe vehicle) can use, for example, as perceptual information, results of a photogrammetric range imaging technique (e.g., an SfM technique) to determine distances and bearings to the landmarks (e.g., keypoints) in the images. Positions of points (e.g., keypoints) on the landmarks can be determined, for example, using: (1) the pose of the camera (e.g., attached to the vehicle) and (2) the distances and the bearings to the landmarks (e.g., keypoints) in the images.

In this manner, the data affiliated with the images of the location can, for an image of the images, exclude a depiction of any of the objects, but include information about: (1) the pose of the camera that produced the image, (2) one or more positions of points on landmarks in the image, and (3) semantic information affiliated with the objects. For example, an amount of the data affiliated with the image can be less than a threshold amount. For example, the threshold amount can be 300 bytes. For example, the landmark can be a sign. For example, the data affiliated with the images can include information about the sign. For example, the information about the sign can include: (1) for a center of the sign, a latitude position, a longitude position, and an altitude, (2) a height of the sign, and (3) a width of the sign. Additionally or alternatively, for example, the information about the sign can include information about a message communicated by the sign. For example, the data affiliated with the images can be produced by an automated driving system of active safety technologies and advanced driver assistance systems (ADAS). For example, the automated driving system can be a third generation of the Toyota Safety Sense™ system (TSS3).

For example, for a vehicle of the set of vehicles (e.g., the probe vehicles), a transmission of a batch of the data affiliated with the images, produced by a camera of the vehicle of the set of vehicles (e.g., the probe vehicles), can be received in a specific duration of time. For example, the specific duration of time can be thirty seconds. For example, the transmission of the batch can be received at a specific communication rate. For example, the specific communication rate can be once per thirty seconds.

The disclosed technologies can produce, from the data affiliated with the images of the location, the digital (e.g., HD) map of the location using, for example, offline SLAM techniques. For example, the digital map can be produced by processing, using one or more data association techniques, the data affiliated with the images to determine correspondence of the position of the point (e.g., keypoint) affiliated with a specific object (e.g., landmark), included in a first image of the images, with the position of the point (e.g., keypoint) affiliated with the specific object (e.g., landmark) included in a second image of the images.

For example, the digital (e.g., HD) map can be produced by grouping the images into keyframes and processing, using at least one SLAM optimization technique, the keyframes. For example: (1) a first keyframe, of the keyframes, can be characterized by a first measure, (2) a second keyframe, of the keyframes, can be characterized by a second measure, and (3) a difference between the first measure and the second measure can be greater than a threshold. The first measure can be of values of the data included in the first keyframe. The second measure can be of values of the data included in the second keyframe. For example, a count of the images included in a keyframe can be a function of a distance traveled by the vehicle of the set of vehicles (e.g., the probe vehicle).

FIG. 1 includes a diagram that illustrates an example of an environment 100 for using a machine learning technique to perform data association operations for positions of points that represent objects in images of a location, according to the disclosed technologies. For example, the environment 100 can include a road 102. For example, the road 102 can include a south portion 104 and a north portion 106. For example, the south portion 104 can be disposed along a line of longitude. For example, the north portion 106 can gradually curve in an easterly direction around a hill 108. For example, the road 102 can include a lane 110 for southbound traffic and a lane 112 for northbound traffic. For example, the lane 110 can be bounded on the west by a road boundary 114. For example, the lane 112 can be bounded on the cast by a road boundary 116. For example, the lane 110 can be bounded on the east and the lane 112 can be bounded on the west by a lane boundary 118. For example, the lane boundary 118 can be a lane marking 120 that indicates a separation between lanes in which streams of traffic flow in opposite directions. For example, the lane marking 120 can be two solid yellow lines.

For example, the environment 100 can include a first road sign 122, a second road sign 124, and a third road sign 126. For example, the first road sign 122 can be located east of the road boundary 116 at a northern periphery of the south portion 104 of the road 102. For example, the first road sign 122 can be a “Slow” road sign. For example, the second road sign 124 can be located forty meters north of the first road sign 122. For example, the second road sign 124 can also be a “Slow” road sign. For example, the third road sign 126 can be located forty meters north of the second road sign 124. For example, the third road sign 126 can also be a “Slow” road sign.

For example, the environment 100 can include a first vehicle 128, a second vehicle 130, a third vehicle 132, and a fourth vehicle 134. For example, a high-precision proprioception information device 136 can be disposed on the first vehicle 128. For example, the high-precision proprioception information device 136 can be a real-time kinematic (RTK) global navigation satellite system (GNSS) receiver 138. For example, the RTK GNSS receiver 138 can indicate a position of the first vehicle 128 with a degree of accuracy that is within a centimeter. For example, a forward-facing camera 140 can be attached to the first vehicle 128. For example, a forward-facing camera 142 can be attached to the second vehicle 130. For example, a forward-facing camera 144 can be attached to the third vehicle 132. For example, a communications device 146 can be disposed on the first vehicle 128. For example, a communications device 148 can be disposed on the second vehicle 130. For example, a communications device 150 can be disposed on the third vehicle 132. For example, a communications device 152 can be disposed on the fourth vehicle 134.

For example, the environment 100 can include a system 154 for producing, from data affiliated with images of a location, a digital map. For example, the system 154 can include a communications device 156.

For example, at a first time ($t_1$), the first vehicle 128 can be located in the lane 112 two meters behind the first road sign 122.

For example, at a second time ($t_2$), the first vehicle 128 can be located in the lane 112 five meters behind the second road sign 124.

For example, at a third time ($t_3$), the second vehicle 130 can be located in the lane 112 two meters behind the first road sign 122. That is, at the third time ($t_3$), the second vehicle 130 can be at a position of the first vehicle 128 at the first time ($t_1$).

For example, at a fourth time ($t_4$), the second vehicle 130 can be located in the lane 112 five meters behind the second road sign 124. That is, at the fourth time ($t_4$), the second vehicle 130 can be at a position of the first vehicle 128 at the second time ($t_2$).

For example, at a fifth time ($t_5$), the third vehicle 132 can be located in the lane 112 two meters behind the first road sign 122 and the fourth vehicle 134 can be located in the lane 112 about fifteen miles behind the third vehicle 132. That is, at the fifth time ($t_5$), the third vehicle 132 can be at the position of the first vehicle 128 at the first time ($t_1$).

For example, at a sixth time ($t_6$), the third vehicle 132 can be located in the lane 112 five meters behind the second road sign 124 and the fourth vehicle 134 can be located in the lane 112 about fifteen miles behind the third vehicle 132. That is, at the sixth time ($t_6$), the third vehicle 132 can be at the position of the first vehicle 128 at the second time ($t_2$).

For example, at the first time ($t_1$) (or the third time ($t_3$) or the fifth time ($t_5$)), the hill 108 may occlude a line of sight between the third road sign 126 and the forward-facing camera 140 attached to the first vehicle 128 (or the forward-facing camera 142 attached to the second vehicle 130 or the forward-facing camera 144 attached to the third vehicle 132).

As described above, objects in an image can be detected using, for example, object detection techniques and recognized using, for example, object recognition techniques. Semantic information can be affiliated with the objects and objects that qualify as landmarks can be determined. For example, the landmarks can include lane boundaries, road boundaries, signs, or the like.

Figure 2:
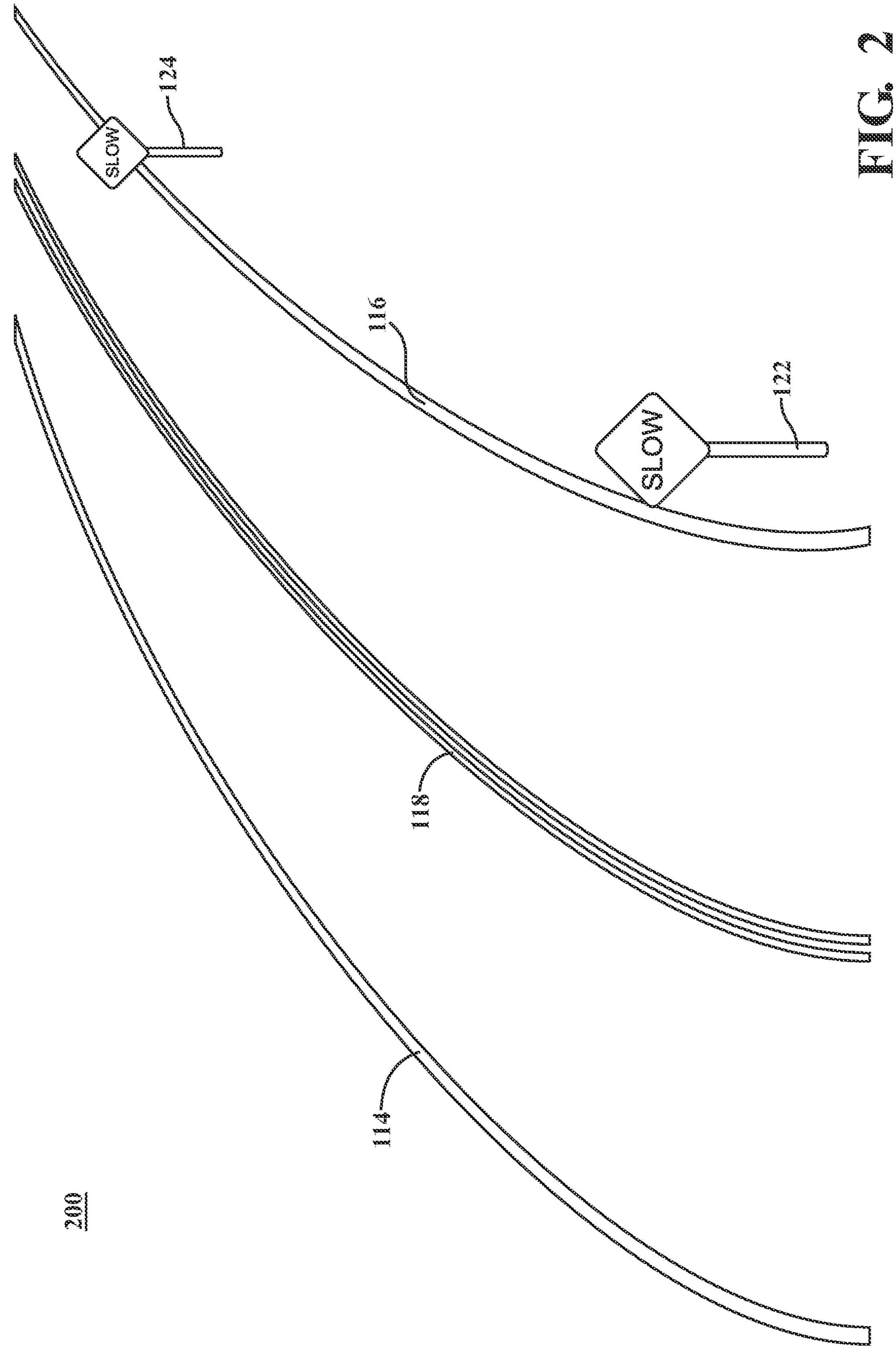
FIG. 2 includes a diagram that illustrates an example of an image produced, at a first time ($t_1$), by a forward-facing camera attached to a northernmost vehicle illustrated in FIG. 1, according to the disclosed technologies.

FIG. 2 includes a diagram that illustrates an example of an image 200 produced, at the first time ($t_1$), by the forward-facing camera 140 attached to the first vehicle 128, according to the disclosed technologies. For example, the image 200 can include the following landmarks: the first road sign 122, the second road sign 124, the road boundary 114, the road boundary 116, and the lane boundary 118. For example, the image 200 can also be produced, at the third time ($t_3$), by the forward-facing camera 142 attached to the second vehicle 130. For example, the image 200 can also be produced, at the fifth time ($t_5$), by the forward-facing camera 144 attached to the third vehicle 132.

Figure 3:
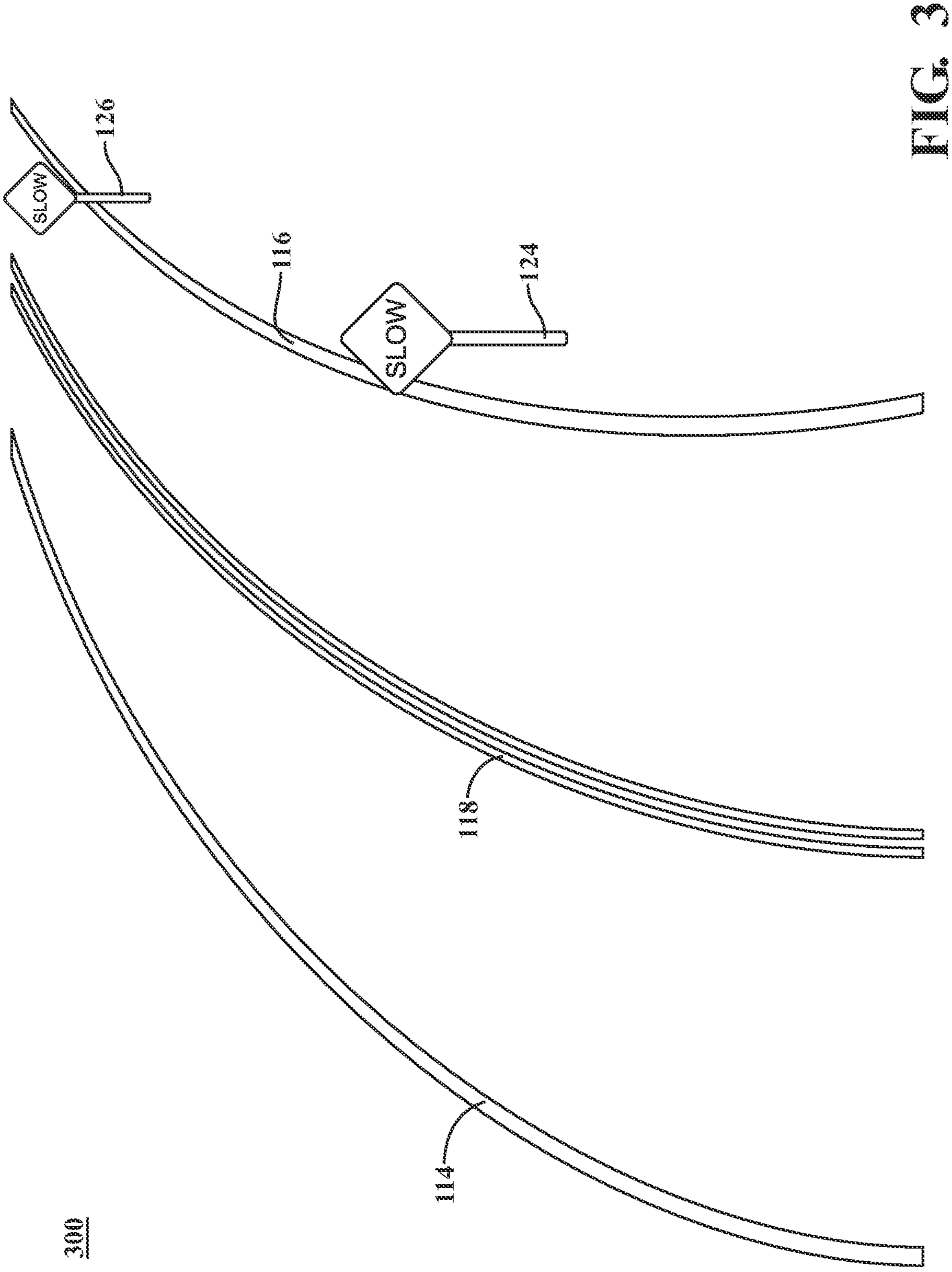
FIG. 3 includes a diagram that illustrates an example of an image produced, at a second time ($t_2$), by a forward-facing camera attached to the northernmost vehicle illustrated in FIG. 1, according to the disclosed technologies.

FIG. 3 includes a diagram that illustrates an example of an image 300 produced, at the second time ($t_2$), by the forward-facing camera 140 attached to the first vehicle 128, according to the disclosed technologies. For example, the image 300 can include the following landmarks: the second road sign 124, the third road sign 126, the road boundary 114, the road boundary 116, and the lane boundary 118. For example, the image 300 can also be produced, at the fourth time ($t_4$), by the forward-facing camera 142 attached to the second vehicle 130. For example, the image 300 can also be produced, at the sixth time ($t_6$), by the forward-facing camera 144 attached to the third vehicle 132.

For example, the images (i.e., the image 200 and the image 300) produced by the forward-facing camera 140 (or the forward-facing camera 142 or the forward-facing camera 144) can be images in a sequence of images produced by the forward-facing camera 140 (or the forward-facing camera 142 or the forward-facing camera 144). For example, the images (i.e., the image 200 and the image 300) produced by the forward-facing camera 140 (or the forward-facing camera 142 or the forward-facing camera 144) can be produced at a specific production rate. For example, the specific production rate can be ten hertz.

As described above, a position of a landmark can be represented by a position of a point on the landmark. For example, the position of the point on the landmark can be affiliated with a position of a keypoint of an object, in an image, that represents the landmark. A keypoint can be a point in an object that has a potential of being repeatedly detected under different imaging conditions. Keypoints in objects can be extracted using, for example, keypoint extraction techniques.

Figure 4:
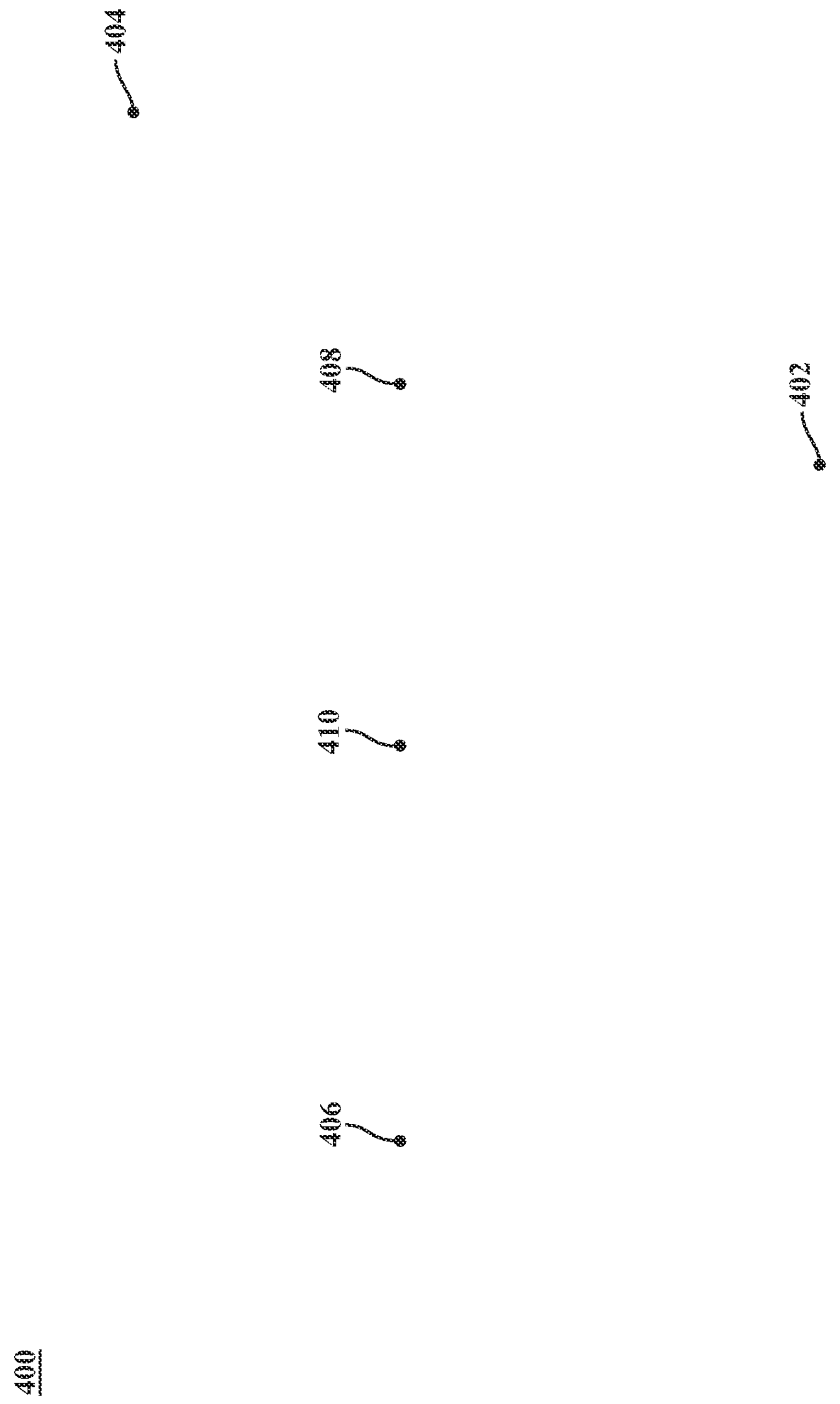
FIG. 4 includes a diagram that illustrates an example of keypoints of landmarks in the image illustrated in FIG. 2, according to the disclosed technologies.

FIG. 4 includes a diagram that illustrates an example of keypoints 400 of landmarks in the image 200, according to the disclosed technologies. For example, the keypoints 400 can include a first keypoint 402 of the first road sign 122, a second keypoint 404 of the second road sign 124, a third keypoint 406 of the road boundary 114, a fourth keypoint 408 of the road boundary 116, and a fifth keypoint 410 of the lane boundary 118. For example, because only those parts of the road boundary 114, the road boundary 116, and the lane boundary 118 captured by the forward-facing camera 140 (or the forward-facing camera 142 or the forward-facing camera 144) are included in the image 200, the third keypoint 406, the fourth keypoint 408, and the fifth keypoint 410 can be for those parts of the road boundary 114, the road boundary 116, and the lane boundary 118 captured by the forward-facing camera 140 (or the forward-facing camera 142 or the forward-facing camera 144) at the first time ($t_1$) (or the third time ($t_3$) or the fifth time ($t_5$)).

Figure 5:
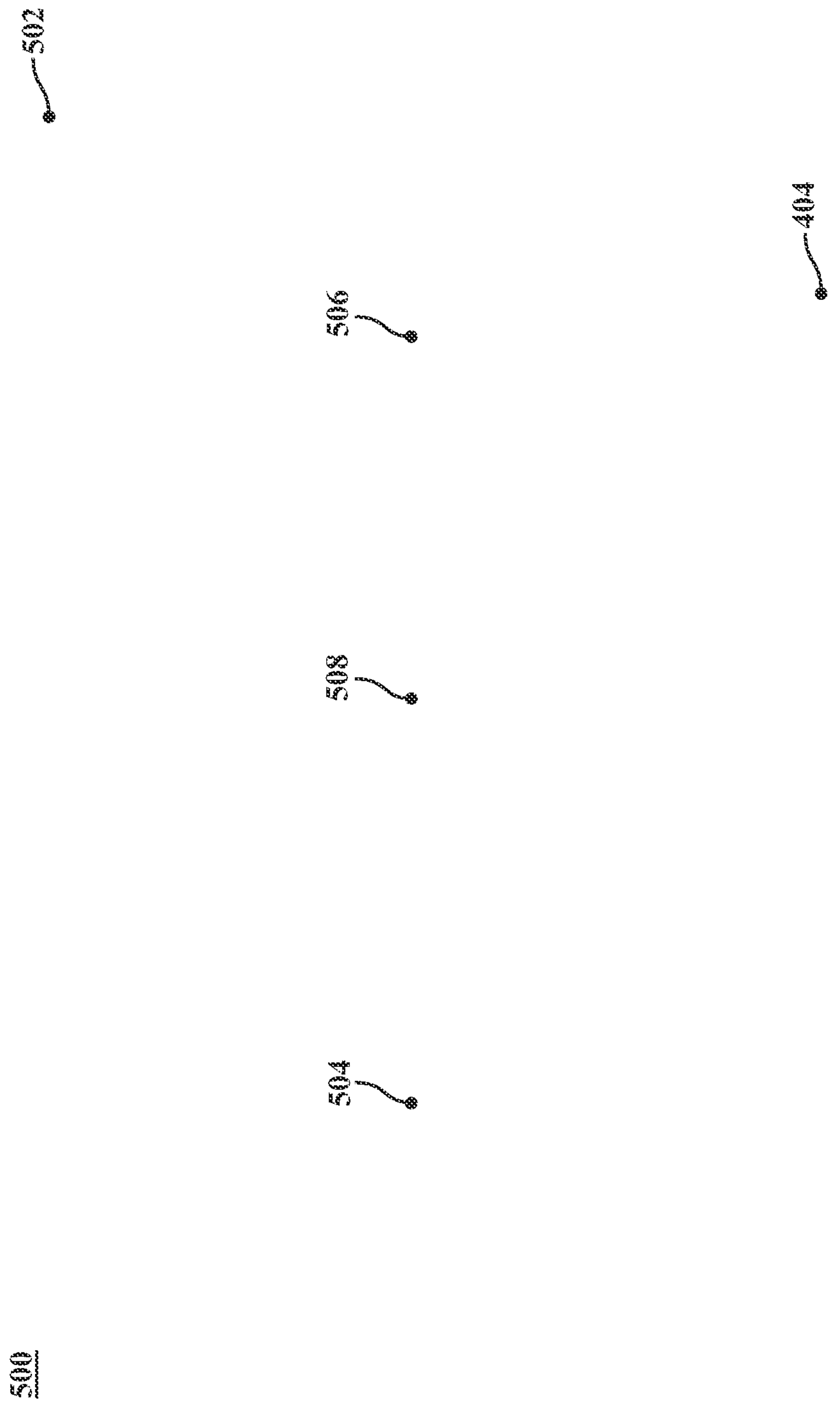
FIG. 5 includes a diagram that illustrates an example of keypoints of landmarks in the image illustrated in FIG. 3, according to the disclosed technologies.

FIG. 5 includes a diagram that illustrates an example of keypoints 500 of landmarks in the image 300, according to the disclosed technologies. For example, the keypoints 500 can include the second keypoint 404 of the second road sign 124, a sixth keypoint 502 of the third road sign 126, a seventh keypoint 504 of the road boundary 114, an eighth keypoint 506 of the road boundary 116, and a ninth keypoint 508 of the lane boundary 118. For example, because only those parts of the road boundary 114, the road boundary 116, and the lane boundary 118 captured by the forward-facing camera 140 (or the forward-facing camera 142 or the forward-facing camera 144) are included in the image 300, the seventh keypoint 504, the eighth keypoint 506, and the ninth keypoint 508 can be for those parts of the road boundary 114, the road boundary 116, and the lane boundary 118 captured by the forward-facing camera 140 (or the forward-facing camera 142 or the forward-facing camera 144) at the second time ($t_2$) (or the fourth time ($t_4$) or the sixth time ($t_6$)). Moreover, portions of those parts of the road boundary 114, the road boundary 116, and the lane boundary 118 captured by the forward-facing camera 140 (or the forward-facing camera 142 or the forward-facing camera 144) included in the image 300 can be different from portions of those parts of the road boundary 114, the road boundary 116, and the lane boundary 118 captured by the forward-facing camera 140 (or the forward-facing camera 142 or the forward-facing camera 144) included in the image 200.

As described above, positions of points (e.g., keypoints) on the landmarks can be determined, for example, using: (1) a pose (i.e., a position and an orientation) of a camera (e.g., attached to a vehicle of the set of vehicles (e.g., the forward-facing camera 140 attached to the first vehicle 128, the forward-facing camera 142 attached to the second vehicle 130, or the forward-facing camera 144 attached to the third vehicle 132)) and (2) distances and bearings to the landmarks (e.g., keypoints) in the images. The vehicle of the set of vehicles can use, for example, proprioception information (e.g., one or more of GNSS information, IMU information, odometry information, or the like) to estimate the pose of the camera (e.g., attached to the vehicle of the set of vehicles). The vehicle of the set of vehicles can use, for example, as perceptual information, results of a photogrammetric range imaging technique (e.g., an SfM technique) to determine the distances and the bearings to the landmarks (e.g., keypoints) in the images.

As described above, in this manner, data affiliated with the images of a location can, for an image of the images, exclude a depiction of any of the objects, but include information about: (1) the pose of the camera that produced the image, (2) one or more positions of points (e.g., keypoints) on landmarks in the image, and (3) semantic information affiliated with the objects. For example, if the landmark is a sign, the data affiliated with the images can include information about the sign. For example, the information about the sign can include: (1) for a center of the sign, a latitude position, a longitude position, and an altitude, (2) a height of the sign, and (3) a width of the sign. Additionally or alternatively, for example, the information about the sign can include information about a message communicated by the sign.

FIGS. 6A-6C include an example of tables 600 that illustrate data affiliated with the images of the location, according to the disclosed technologies. For example, the location can be a portion of the road 102 illustrated in FIG. 1. The tables 600 can include: (1) a first table 602 that illustrates items of the data affiliated with the image 200 produced, at the first time ($t_1$), by the forward-facing camera 140 attached to the first vehicle 128; (2) a second table 604 that illustrates items of the data affiliated with the image 300 produced, at the second time ($t_2$), by the forward-facing camera 140 attached to the first vehicle 128; (3) a third table 606 that illustrates items of the data affiliated with the image 200 produced, at the third time ($t_3$), by the forward-facing camera 142 attached to the second vehicle 130; (4) a fourth table 608 that illustrates items of the data affiliated with the image 300 produced, at the fourth time ($t_4$), by the forward-facing camera 142 attached to the second vehicle 130, (5) a fifth table 610 that illustrates items of the data affiliated with the image 200 produced, at the fifth time ($t_5$), by the forward-facing camera 145 attached to the third vehicle 132; and (6) a sixth table 612 that illustrates items of the data affiliated with the image 300 produced, at the sixth time ($t_6$), by the forward-facing camera 144 attached to the third vehicle 132.

For example: (1) the first table 602 can include a pose 614 of the forward-facing camera 140 attached to the first vehicle 128 at the first time ($t_1$), (2) the second table 604 can include a pose 616 of the forward-facing camera 140 attached to the first vehicle 128 at the second time ($t_2$), (3) the third table 606 can include a pose 618 of the forward-facing camera 142 attached to the second vehicle 130 at the third time ($t_3$), (4) the fourth table 608 can include a pose 620 of the forward-facing camera 142 attached to the second vehicle 130 at the fourth time ($t_4$), (5) the fifth table 610 can include a pose 622 of the forward-facing camera 144 attached to the third vehicle 132 at the fifth time ($t_5$), and (6) the sixth table 612 can include a pose 624 of the forward-facing camera 144 attached to the third vehicle 132 at the sixth time ($t_6$).

Each of the first table 602, the third table 606, and the fifth table 610 can include, for example, data affiliated with the first keypoint 402, the second keypoint 404, the third keypoint 406, the fourth keypoint 408, and the fifth keypoint 410.

Each of the second table 604, the fourth table 608, and the sixth table 612 can include, for example, data affiliated with the second keypoint 404, the sixth keypoint 502, the seventh keypoint 504, the eighth keypoint 506, and the ninth keypoint 508.

One or more circumstances affiliated with production of the data affiliated with the images of the location can cause, for example, the information about: (1) the pose of the camera, (2) the one or more positions of the points on the landmarks, or (3) both to include one or more errors. For example, errors in the proprioception information (e.g., the one or more of the GNSS information, the IMU information, the odometry information, or the like) can cause the information about the pose of the camera to include one or more errors. For example, changes in illumination of one or more of the landmarks at one or more of the first time ($t_1$), the second time ($t_2$), the third time ($t_3$), the fourth time ($t_4$), the fifth time ($t_5$), or the sixth time ($t_6$) can cause the results the photogrammetric range imaging technique (e.g., the SfM technique) to include one or more errors so that the distances and the bearings to the landmarks (e.g., keypoints) in the images, determined from photogrammetric range imaging technique (e.g., the SfM technique), include one or more errors. One of skill in the art, in light of the description herein, understands that one or more other circumstances can cause one or more other errors to be included in the information about: (1) the pose of the camera, (2) the one or more positions of the points on the landmarks, or (3) both. Individually or cumulatively, these errors can cause information included in an item of the data affiliated with an image produced at one time by a specific source (e.g., the forward-facing camera 140 attached to the first vehicle 128, the forward-facing camera 142 attached to the second vehicle 130, or the forward-facing camera 144 attached to the third vehicle 132) to be different from a corresponding item of data affiliated with an image produced: (1) at a different time, (2) by a different specific source, or (3) both. This situation is illustrated in values of the items of the data contained in the tables 600 included in FIGS. 6A-6C.

As described above, the second vehicle 130, the third vehicle 132, or both can transmit the data affiliated with the images to the system 154 for producing, from the data affiliated with images of the location, the digital map. For example, the communications device 148 disposed on the second vehicle 130 can transmit the data, produced at the third time ($t_3$) and at the fourth time ($t_4$) (e.g., the third table 606 and the fourth table 608), to the communications device 156 included in the system 154. Likewise, for example, the communications device 150 disposed on the third vehicle 132 can transmit the data, produced at the fifth time ($t_5$) and at the sixth time ($t_6$) (e.g., the fifth table 610 and the sixth table 612), to the communications device 156 included in the system 154.

Figure 7:
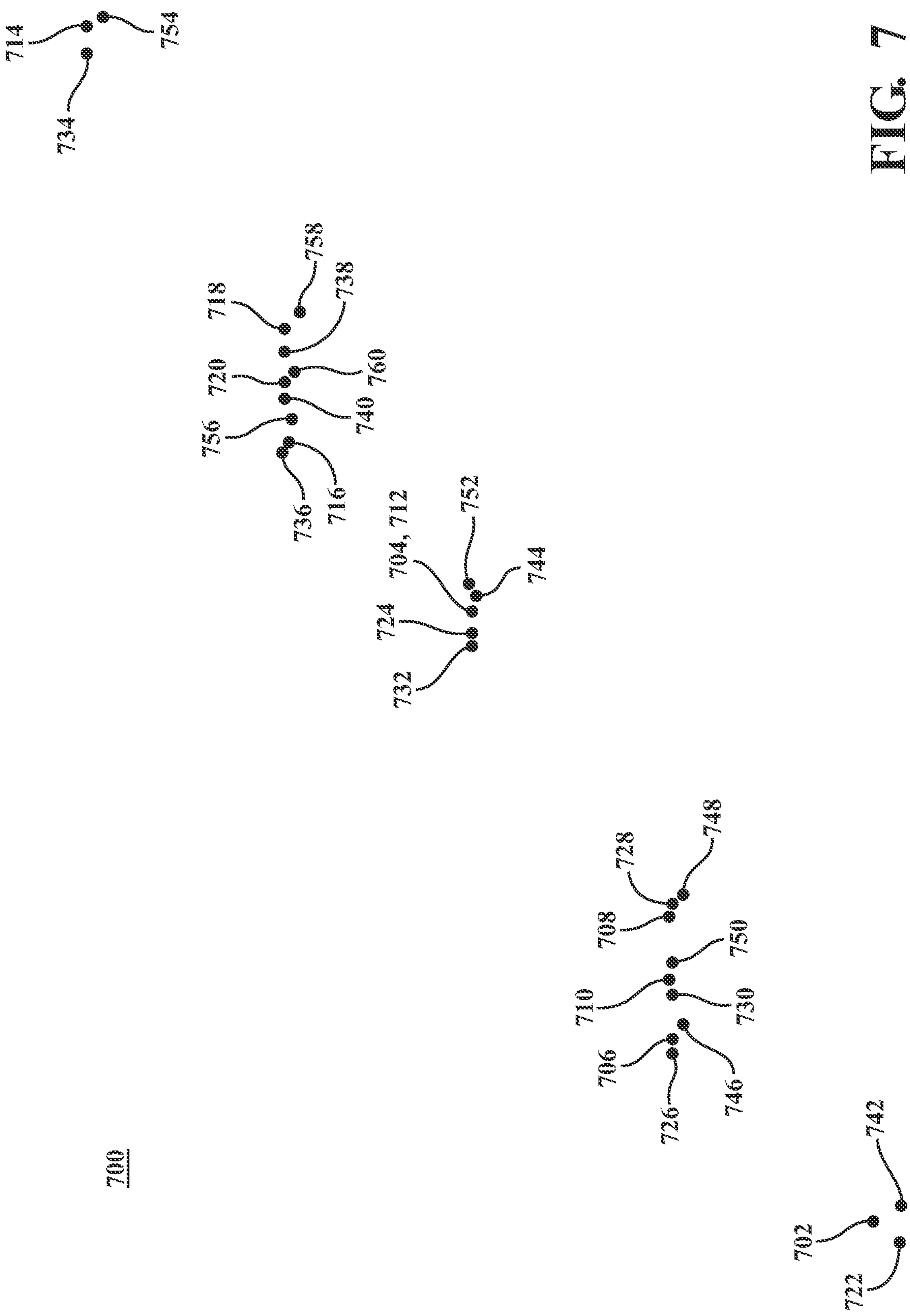
FIG. 7 includes a diagram that illustrates an example of the positions of the points of the landmarks affiliated with the items of the data contained in the tables included in FIGS. 6A-6C, according to the disclosed technologies.

FIG. 7 includes a diagram 700 that illustrates an example of the positions of the points (e.g., the keypoints) of the landmarks affiliated with the items of the data contained in the tables 600 included in FIGS. 6A-6C, according to the disclosed technologies. For example, the diagram 700 can include: (1) a position 702 of the first keypoint 402 determined by the first vehicle 128 at the first time ($t_1$), (2) a position 704 of the second keypoint 404 determined by the first vehicle 128 at the first time ($t_1$), (3) a position 706 of the third keypoint 406 determined by the first vehicle 128 at the first time ($t_1$), (4) a position 708 of the fourth keypoint 408 determined by the first vehicle 128 at the first time ($t_1$), (5) a position 710 of the fifth keypoint 410 determined by the first vehicle 128 at the first time ($t_1$), (6) a position 712 of the second keypoint 404 determined by the first vehicle 128 at the second time ($t_2$), (7) a position 714 of the sixth keypoint 502 determined by the first vehicle 128 at the second time ($t_2$), (8) a position 716 of the seventh keypoint 504 determined by the first vehicle 128 at the second time ($t_2$), (9) a position 718 of the eighth keypoint 506 determined by the first vehicle 128 at the second time ($t_2$), (10) a position 720 of the ninth keypoint 508 determined by the first vehicle 128 at the second time ($t_2$), (11) a position 722 of the first keypoint 402 determined by the second vehicle 130 at the third time ($t_3$), (12) a position 724 of the second keypoint 404 determined by the second vehicle 130 at the third time ($t_3$), (13) a position 726 of the third keypoint 406 determined by the second vehicle 130 at the third time ($t_3$), (14) a position 728 of the fourth keypoint 408 determined by the second vehicle 130 at the third time ($t_3$), (15) a position 730 of the fifth keypoint 410 determined by the second vehicle 130 at the third time ($t_3$), (16) a position 732 of the second keypoint 404 determined by the second vehicle 130 at the fourth time ($t_4$), (17) a position 734 of the sixth keypoint 502 determined by the second vehicle 130 at the fourth time ($t_4$), (18) a position 736 of the seventh keypoint 504 determined by the second vehicle 130 at the fourth time ($t_4$), (19) a position 738 of the eighth keypoint 506 determined by the second vehicle 130 at the fourth time ($t_4$), (20) a position 740 of the ninth keypoint 508 determined by the second vehicle 130 at the fourth time ($t_4$), (21) a position 742 of the first keypoint 402 determined by the third vehicle 132 at the fifth time ($t_5$), (22) a position 744 of the second keypoint 404 determined by the third vehicle 132 at the fifth time ($t_5$), (23) a position 746 of the third keypoint 406 determined by the third vehicle 132 at the fifth time ($t_5$), (24) a position 748 of the fourth keypoint 408 determined by the third vehicle 132 at the fifth time ($t_5$), (25) a position 750 of the fifth keypoint 410 determined by the third vehicle 132 at the fifth time ($t_5$), (26) a position 752 of the second keypoint 404 determined by the third vehicle 132 at the sixth time ($t_6$), (27) a position 754 of the sixth keypoint 502 determined by the third vehicle 132 at the sixth time ($t_6$), (28) a position 756 of the seventh keypoint 504 determined by the third vehicle 132 at the sixth time ($t_6$), (29) a position 758 of the eighth keypoint 506 determined by the third vehicle 132 at the sixth time ($t_6$), and (30) a position 760 of the ninth keypoint 508 determined by the third vehicle 132 at the sixth time ($t_6$).

Figure 8:
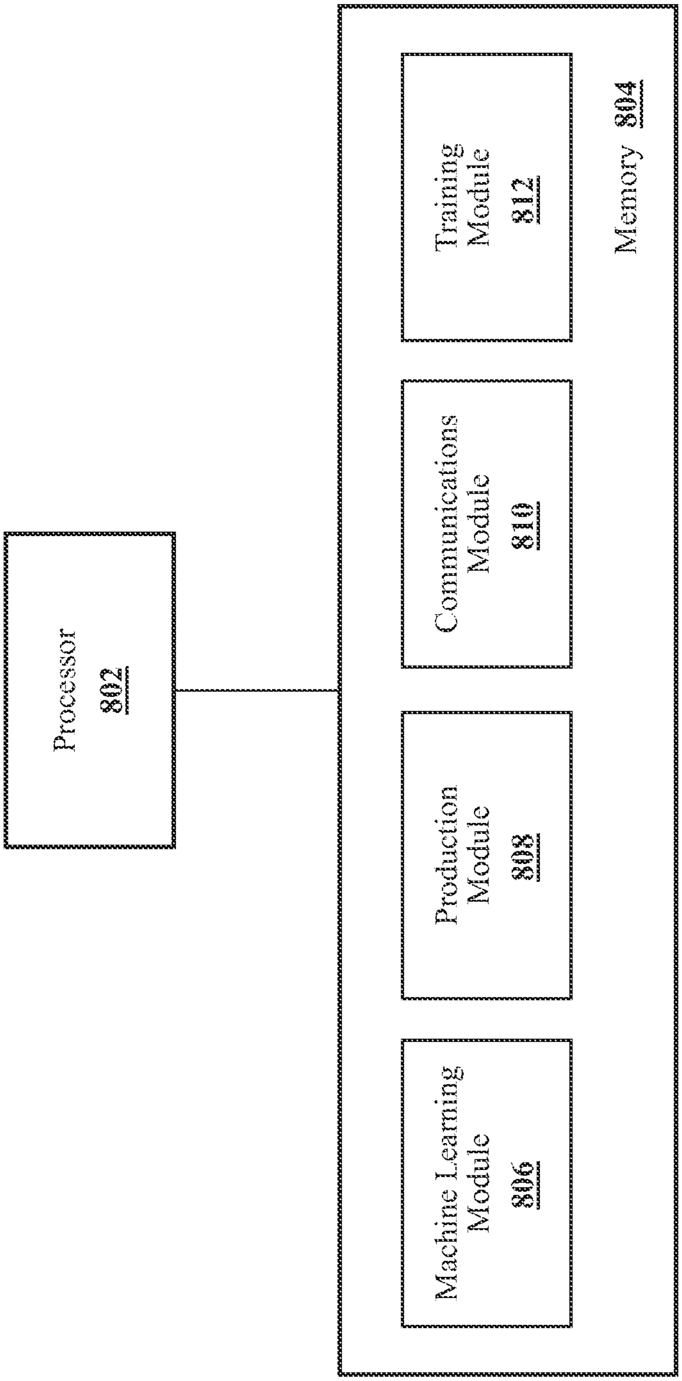
FIG. 8 includes a block diagram that illustrates an example of a system for using a machine learning technique to perform data association operations for positions of points that represent objects in images of a location, according to the disclosed technologies.

FIG. 8 includes a block diagram that illustrates an example of a system 800 for using a machine learning technique to perform data association operations for positions of points that represent objects in images of a location, according to the disclosed technologies. For example, the system 800 can be the system 154 illustrated in FIG. 1. The system 800 can include, for example, a processor 802 and a memory 804. The memory 804 can be communicably coupled to the processor 802. For example, the memory 804 can store a machine learning module 806, a production module 808, and a communications module 810.

For example, the machine learning module 806 can include instructions that function to control the processor 802, operating the machine learning technique, to receive information. The information can: (1) include the positions of the points that represent the objects in the images of the location and (2) include a pose of a camera that produced the images, but (3) exclude a depiction of any of the objects. For example, the points can include keypoints. For example, the information can further include semantic information affiliated with the objects.

For example, the instructions to receive the information can include instructions to receive, from a set of vehicles, the information. For example, the pose of the camera can include a set of poses from a set of cameras. With reference to FIG. 1, for example, the instructions to receive the information can cause the communications device 156 included in the system 154 to receive the information from the communications device 148 disposed on the second vehicle 130, the communications device 150 disposed on the third vehicle 132, or both.

For example, the instructions to receive can include instructions to receive, from a vehicle of the set of vehicles and at a specific communication rate, at least some of the information. For example, the specific communication rate can be once per thirty seconds. For example, the information can be determined by an automated driving system of active safety technologies and advanced driver assistance systems (ADAS). For example, the automated driving system can be a third generation of the Toyota Safety Sense™ system (TSS3). For example, an amount the information, for an image of the images, can be about 300 bytes. For example, the camera can be a component in a lane keeping assist (LKA) system. For example, the images produced by the camera can be produced at a specific production rate. For example, the specific production rate can be ten hertz.

Returning to FIG. 8, for example, the machine learning module 806 can include instructions that function to control the processor 802, operating the machine learning technique, to produce results of the data association operations for the positions of the points.

For example, the machine learning technique can use a Siamese neural network. A Siamese neural network can be an artificial neural network configured to include a first sub-network and a second sub-network. The first sub-network and the second sub-network can be configured to have the same weights applied to corresponding nodes and to operate in parallel. Each of the first sub-network and the second sub-network can be configured to receive an input and to produce an output. The Siamese neural network can be configured to determine a relationship between an output of the first sub-network and an output of the second sub-network. For example, the relationship can be a value of a contrastive loss function of a measurement of the output of the first sub-network and a measurement of the output of the second sub-network.

Figure 9:
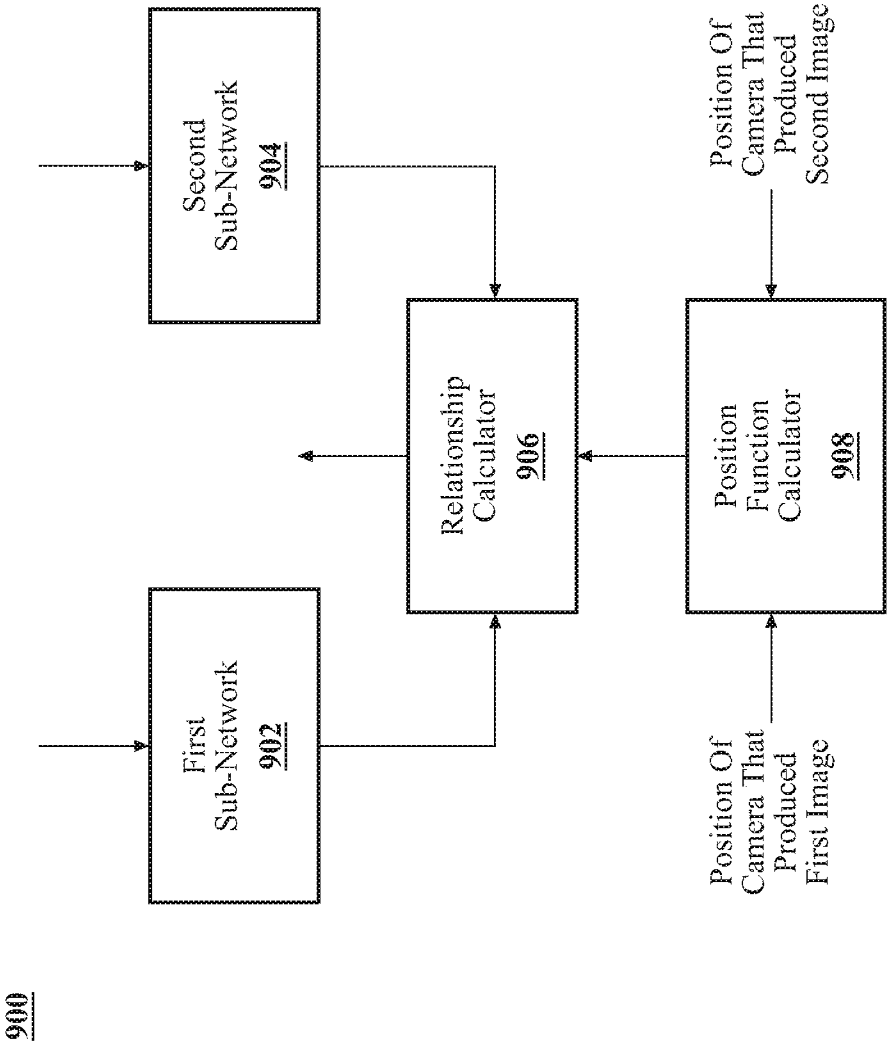
FIG. 9 includes a block diagram that illustrates an example of a Siamese neural network, according to the disclosed technologies.

FIG. 9 includes a block diagram that illustrates an example of a Siamese neural network 900, according to the disclosed technologies. For example, the Siamese neural network 900 can include a first sub-network 902, a second sub-network 904, and a relationship calculator 906.

For example, the images can include a first image and a second image. The information can include a first set of information and a second set of information. The first set of information can include: (1) a first set of positions and (2) the pose of the camera that produced the first image. The first set of positions can be of the points that represent the objects in the first image. The second set of information can include: (1) a second set of positions and (2) the pose of the camera that produced the second image. The second set of positions can be of the points that represent the objects in the second image. The instructions to receive can include, for example, instructions: (1) to receive, by a first sub-network of the Siamese neural network, the first set of positions and (2) to receive, by a second sub-network of the Siamese neural network, the second set of positions. The instructions to produce the results can include instructions to determine a relationship between a measurement of an output of the first sub-network and a measurement of an output of the second sub-network.

For example, the first sub-network can be the first sub-network 902 and the second sub-network can be the second sub-network 904. For example, the relationship calculator 906 can be configured to determine the relationship between the measurement of the output of the first sub-network 902 and the measurement of the output of the second sub-network 904.

In a first implementation, for example, the instructions to determine the relationship can include instructions to determine a value of a contrastive loss function of the measurement of the output of the first sub-network and the measurement of the output of the second sub-network.

For example: (1) the measurement of the output of the first sub-network can be a measurement of a specific position of the first set of positions, (2) the measurement of the output of the second sub-network can be a measurement of a specific position of the second set of positions, and (3) in response to the value of the contrastive loss function being less than a threshold, the specific position, of the first set of positions, can be considered to be associated with the specific position of second set of positions.

With reference to FIG. 2, for example: (1) the first image can be the image 200 produced, at the third time ($t_3$), by the forward-facing camera 142 attached to the second vehicle 130 and (2) the second image can be the image 200 produced, at the fifth time ($t_5$), by the forward-facing camera 144 attached to the third vehicle 132.

With reference to FIG. 7, for example: (1) the first set of positions can include: (a) the position 722, (b) the position 724, (c) the position 726, (d) the position 728, and (e) the position 730; and (2) the second set of positions can include: (a) the position 742, (b) the position 744, (c) the position 746, (d) the position 748, and (e) the position 750.

FIG. 10 includes a table 1000 that illustrates values of the contrastive loss function between: (1) specific positions of the first set of positions and (2) specific positions of the second set of positions, according to the disclosed technologies. The table 1000 can indicate that the value of the contrastive loss function: (1) between the position 722 and the position 742 is less than the threshold, (2) between the position 722 and the position 744 is greater than the threshold, (3) between the position 722 and the position 746 is greater than the threshold, (4) between the position 722 and the position 748 is greater than the threshold, (5) between the position 722 and the position 750 is greater than the threshold, (6) between the position 724 and the position 742 is greater than the threshold, (7) between the position 724 and the position 744 is less than the threshold, (8) between the position 724 and the position 746 is greater than the threshold, (9) between the position 724 and the position 748 is greater than the threshold, (10) between the position 724 and the position 750 is greater than the threshold, (11) between the position 726 and the position 742 is greater than the threshold, (12) between the position 726 and the position 744 is greater than the threshold, (13) between the position 726 and the position 746 is less than the threshold, (14) between the position 726 and the position 748 is greater than the threshold, (15) between the position 726 and the position 750 is greater than the threshold, (16) between the position 728 and the position 742 is greater than the threshold, (17) between the position 728 and the position 744 is greater than the threshold, (18) between the position 728 and the position 746 is greater than the threshold. (19) between the position 728 and the position 748 is less than the threshold, (20) between the position 728 and the position 750 is greater than the threshold, (21) between the position 730 and the position 742 is greater than the threshold, (22) between the position 730 and the position 744 is greater than the threshold, (23) between the position 730 and the position 746 is greater than the threshold, (24) between the position 730 and the position 748 is greater than the threshold, and (25) between the position 730 and the position 750 is less than the threshold.

Additionally or alternatively, for example: (1) a position of the pose of the camera that produced the first image can be based on proprioception information affiliated with the camera that produced the first image, (2) a position of the pose of the camera that produced the second image can be based on proprioception information affiliated with the camera that produced the second image, and (3) the contrastive loss function can include: (a) the position of the pose of the camera that produced the first image and (b) the position of the pose of the camera that produced the second image.

Returning to FIG. 9, for example, the Siamese neural network 900 can further include a position function calculator 908. The position function calculator 908 can be configured, for example, to receive: (1) the position of the camera that produced the first image and (2) the position of the camera that produced the second image. The position function calculator 908 can be configured, for example, to produce a value of a function of the position of the camera that produced the first image and the position of the camera that produced the second image. For example, the relationship calculator 906 can further be configured include the value of the function of the position of the camera that produced the first image and the position of the camera that produced the second image in a determination of the relationship between the measurement of the output of the first sub-network 902 and the measurement of the output of the second sub-network 904.

In a second implementation, for example: (1) the first image can have been produced at a first time and (2) the second image can have been produced at a second time. For example: (1) the first image produced at the first time can be a first keyframe and (2) the second image produced at the second time can be a second keyframe. The instructions to receive can include, for example, instructions: (1) to receive, by the first sub-network, a first set of feature vectors based on the first set of positions and (2) to receive, by the second sub-network, a second set of feature vectors based on the second set of positions. A feature vector can include, for example, feature information about an object represented by a point at a position.

With reference to FIGS. 2 and 3, for example: (1) the first image can be the image 200 produced, at the third time ($t_3$), by the forward-facing camera 142 attached to the second vehicle 130 and (2) the second image can be the image 300 produced, at the fourth time ($t_4$), by the forward-facing camera 142 attached to the second vehicle 130.

With reference to FIG. 7, for example: (1) the first set of positions can include: (a) the position 722, (b) the position 724, (c) the position 726, (d) the position 728, and (e) the position 730; and (2) the second set of positions can include: (a) the position 732, (b) the position 734, (c) the position 736, (d) the position 738, and (e) the position 740.

FIG. 11 includes a table 1100 that illustrates values of the contrastive loss function between: (1) feature vectors based on the first set of positions and (2) feature vectors based on the second set of positions, according to the disclosed technologies. The table 1100 can indicate that the value of the contrastive loss function: (1) between the feature vector based on the position 722 and the feature vector based on the position 732 is greater than the threshold, (2) between the feature vector based on the position 722 and the feature vector based on the position 734 is greater than the threshold, (3) between the feature vector based on the position 722 and the feature vector based on the position 736 is greater than the threshold, (4) between the feature vector based on the position 722 and the feature vector based on the position 738 is greater than the threshold, (5) between the feature vector based on the position 722 and the feature vector based on the position 740 is greater than the threshold, (6) between the feature vector based on the position 724 and the feature vector based on the position 732 is less than the threshold, (7) between the feature vector based on the position 724 and the feature vector based on the position 734 is greater than the threshold, (8) between the feature vector based on the position 724 and the feature vector based on the position 736 is greater than the threshold, (9) between the feature vector based on the position 724 and the feature vector based on the position 738 is greater than the threshold, (10) between the feature vector based on the position 724 and the feature vector based on the position 740 is greater than the threshold, (11) between the feature vector based on the position 726 and the feature vector based on the position 732 is greater than the threshold, (12) between the feature vector based on the position 726 and the feature vector based on the position 734 is greater than the threshold, (13) between the feature vector based on the position 726 and the feature vector based on the position 736 is less than the threshold, (14) between the feature vector based on the position 726 and the feature vector based on the position 738 is greater than the threshold, (15) between the feature vector based on the position 726 and the feature vector based on the position 740 is greater than the threshold, (16) between the feature vector based on the position 728 and the feature vector based on the position 732 is greater than the threshold, (17) between the feature vector based on the position 728 and the feature vector based on the position 734 is greater than the threshold, (18) between the feature vector based on the position 728 and the feature vector based on the position 736 is greater than the threshold, (19) between the feature vector based on the position 728 and the feature vector based on the position 738 is less than the threshold, (20) between the feature vector based on the position 728 and the feature vector based on the position 740 is greater than the threshold, (21) between the feature vector based on the position 730 and the feature vector based on the position 732 is greater than the threshold, (22) between the feature vector based on the position 730 and the feature vector based on the position 734 is greater than the threshold, (23) between the feature vector based on the position 730 and the feature vector based on the position 736 is greater than the threshold, (24) between the feature vector based on the position 730 and the feature vector based on the position 738 is greater than the threshold, and (25) between the feature vector based on the position 730 and the feature vector based on the position 740 is less than the threshold.

In a third implementation, for example: (1) the camera can include a first camera and a second camera, (2) the first camera produced the first image, and (3) the second camera produced the second image. The instructions to receive can include instructions: (1) to receive, by the first sub-network, a first set of structural information based on the first set of positions and (2) to receive, by the second sub-network, a second set of structural information based on the second set of positions. An item of structural information around a point, that represents an object and has a position, can be encoded.

With reference to FIG. 2, for example: (1) the first image can be the image 200 produced, at the third time ($t_3$), by the forward-facing camera 142 attached to the second vehicle 130 and (2) the second image can be the image 200 produced, at the fifth time ($t_5$), by the forward-facing camera 144 attached to the third vehicle 132.

With reference to FIG. 7, for example: (1) the first set of positions can include: (a) the position 722, (b) the position 724, (c) the position 726, (d) the position 728, and (e) the position 730; and (2) the second set of positions can include: (a) the position 742, (b) the position 744, (c) the position 746, (d) the position 748, and (c) the position 750.

FIG. 12 includes a table 1200 that illustrates values of the contrastive loss function between: (1) structural information based on the first set of positions and (2) structural information based on the second set of positions, according to the disclosed technologies. The table 1200 can indicate that the value of the contrastive loss function: (1) between the structural information based on the position 722 and the structural information based on the position 742 is less than the threshold, (2) between the structural information based on the position 722 and the structural information based on the position 744 is greater than the threshold, (3) between the structural information based on the position 722 and the structural information based on the position 746 is greater than the threshold, (4) between the structural information based on the position 722 and the structural information based on the position 748 is greater than the threshold, (5) between the structural information based on the position 722 and the structural information based on the position 750 is greater than the threshold, (6) between the structural information based on the position 724 and the structural information based on the position 742 is greater than the threshold, (7) between the structural information based on the position 724 and the structural information based on the position 744 is less than the threshold, (8) between the structural information based on the position 724 and the structural information based on the position 746 is greater than the threshold, (9) between the structural information based on the position 724 and the structural information based on the position 748 is greater than the threshold, (10) between the structural information based on the position 724 and the structural information based on the position 750 is greater than the threshold, (11) between the structural information based on the position 726 and the structural information based on the position 742 is greater than the threshold, (12) between the structural information based on the position 726 and the structural information based on the position 744 is greater than the threshold, (13) between the structural information based on the position 726 and the structural information based on the position 746 is less than the threshold, (14) between the structural information based on the position 726 and the structural information based on the position 748 is greater than the threshold, (15) between the structural information based on the position 726 and the structural information based on the position 750 is greater than the threshold, (16) between the structural information based on the position 728 and the structural information based on the position 742 is greater than the threshold, (17) between the structural information based on the position 728 and the structural information based on the position 744 is greater than the threshold, (18) between the structural information based on the position 728 and the structural information based on the position 746 is greater than the threshold, (19) between the structural information based on the position 728 and the structural information based on the position 748 is less than the threshold, (20) between the structural information based on the position 728 and the structural information based on the position 750 is greater than the threshold, (21) between the structural information based on the position 730 and the structural information based on the position 742 is greater than the threshold, (22) between the structural information based on the position 730 and the structural information based on the position 744 is greater than the threshold, (23) between the structural information based on the position 730 and the structural information based on the position 746 is greater than the threshold, (24) between the structural information based on the position 730 and the structural information based on the position 748 is greater than the threshold, and (25) between the structural information based on the position 730 and the structural information based on the position 750 is less than the threshold.

In a fourth implementation, for example: (1) the first image can include an earlier first image and a later first image and (2) the second image can include an earlier second image and a later second image. For example, the first set of positions can include: (1) an earlier first set of positions and (2) a later first set of positions. For example, the second set of positions can include: (1) an earlier second set of positions and (2) a later second set of positions. The instructions to receive can include instructions: (1) to receive, by the first sub-network, a first set of feature vectors based on the earlier first set of positions and the later first set of positions and (2) to receive, by the second sub-network, a second set of feature vectors based on the earlier second set of positions and the later second set of positions.

With reference to FIGS. 2 and 3, for example: (1) the earlier first image can be the image 200 produced, at the third time ($t_3$), by the forward-facing camera 142 attached to the second vehicle 130, (2) the later first image can be the image 300 produced, at the fourth time ($t_4$), by the forward-facing camera 142 attached to the second vehicle 130, (3) the earlier second image can be the image 200 produced, at the fifth time ($t_5$), by the forward-facing camera 144 attached to the third vehicle 132, and (4) the later second image can be the image 300 produced, at the sixth time ($t_6$), by the forward-facing camera 144 attached to the third vehicle 132.

With reference to FIG. 7, for example: (1) the earlier first set of positions can include: (a) the position 722. (b) the position 724, (c) the position 726, (d) the position 728, and (e) the position 730; (2) the later first set of positions can include: (a) the position 732, (b) the position 734, (c) the position 736, (d) the position 738, and (e) the position 740; (3) the earlier second set of positions can include: (a) the position 742, (b) the position 744, (c) the position 746, (d) the position 748, and (c) the position 750; and (4) the later second set of positions can include: (a) the position 752, (b) the position 754, (c) the position 756, (d) the position 758, and (c) the position 760.

FIG. 13 includes a table 1300 that illustrates values of the contrastive loss function between: (1) feature vectors based on the earlier first set of positions and the later first set of positions and (2) feature vectors based on the earlier second set of positions and the later second set of positions, according to the disclosed technologies. The table 1300 can indicate that the value of the contrastive loss function: (1) between the feature vector based on the position 722 and the feature vector based on the position 742 is less than the threshold, (2) between the feature vector based on the position 722 and the feature vector based on: (a) the position 744 and (b) the position 752 is greater than the threshold, (3) between the feature vector based on the position 722 and the feature vector based on the position 754 is greater than the threshold, (4) between the feature vector based on the position 722 and the feature vector based on: (a) the position 746 and (b) the position 756 is greater than the threshold, (5) between the feature vector based on the position 722 and the feature vector based on: (a) the position 748 and (b) the position 758 is greater than the threshold, (6) between the feature vector based on the position 722 and the feature vector based on: (a) the position 750 and (b) the position 760 is greater than the threshold, (7) between the feature vector based on: (a) the position 724 and (b) the position 732 and the feature vector based on the position 742 is greater than the threshold, (8) between the feature vector based on: (a) the position 724 and (b) the position 732 and the feature vector based on: (a) the position 744 and (b) the position 752 is less than the threshold, (9) between the feature vector based on: (a) the position 724 and (b) the position 732 and the feature vector based on the position 754 is greater than the threshold, (10) between the feature vector based on: (a) the position 724 and (b) the position 732 and the feature vector based on: (a) the position 746 and (b) the position 756 is greater than the threshold, (11) between the feature vector based on: (a) the position 724 and (b) the position 732 and the feature vector based on: (a) the position 748 and (b) the position 758 is greater than the threshold, (12) between the feature vector based on: (a) the position 724 and (b) the position 732 and the feature vector based on: (a) the position 750 and (b) the position 760 is greater than the threshold, (13) between the feature vector based on the position 734 and the feature vector based on the position 742 is greater than the threshold, (14) between the feature vector based on the position 734 and the feature vector based on: (a) the position 744 and (b) the position 752 is greater than the threshold, (15) between the feature vector based on the position 734 and the feature vector based on the position 754 is less than the threshold, (16) between the feature vector based on the position 734 and the feature vector based on: (a) the position 746 and (b) the position 756 is greater than the threshold, (17) between the feature vector based on the position 734 and the feature vector based on: (a) the position 748 and (b) the position 758 is greater than the threshold, (18) between the feature vector based on the position 734 and the feature vector based on: (a) the position 750 and (b) the position 760 is greater than the threshold, (19) between the feature vector based on: (a) the position 726 and (b) the position 736 and the feature vector based on the position 742 is greater than the threshold, (20) between the feature vector based on: (a) the position 726 and (b) the position 736 and the feature vector based on: (a) the position 744 and (b) the position 752 is greater than the threshold, (21) between the feature vector based on: (a) the position 726 and (b) the position 736 and the feature vector based on the position 754 is greater than the threshold, (22) between the feature vector based on: (a) the position 726 and (b) the position 736 and the feature vector based on: (a) the position 746 and (b) the position 756 is less than the threshold, (23) between the feature vector based on: (a) the position 726 and (b) the position 736 and the feature vector based on: (a) the position 748 and (b) the position 758 is greater than the threshold, (24) between the feature vector based on: (a) the position 726 and (b) the position 736 and the feature vector based on: (a) the position 750 and (b) the position 760 is greater than the threshold, (25) between the feature vector based on: (a) the position 728 and (b) the position 738 and the feature vector based on the position 742 is greater than the threshold, (26) between the feature vector based on: (a) the position 728 and (b) the position 738 and the feature vector based on: (a) the position 744 and (b) the position 752 is greater than the threshold, (27) between the feature vector based on: (a) the position 728 and (b) the position 738 and the feature vector based on the position 754 is greater than the threshold, (28) between the feature vector based on: (a) the position 728 and (b) the position 738 and the feature vector based on: (a) the position 746 and (b) the position 756 is greater than the threshold, (29) between the feature vector based on: (a) the position 728 and (b) the position 738 and the feature vector based on: (a) the position 748 and (b) the position 758 is less than the threshold, (30) between the feature vector based on: (a) the position 728 and (b) the position 738 and the feature vector based on: (a) the position 750 and (b) the position 760 is greater than the threshold, (31) between the feature vector based on: (a) the position 730 and (b) the position 740 and the feature vector based on the position 742 is greater than the threshold, (32) between the feature vector based on: (a) the position 730 and (b) the position 740 and the feature vector based on: (a) the position 744 and (b) the position 752 is greater than the threshold, (33) between the feature vector based on: (a) the position 730 and (b) the position 740 and the feature vector based on the position 754 is greater than the threshold, (34) between the feature vector based on: (a) the position 730 and (b) the position 740 and the feature vector based on: (a) the position 746 and (b) the position 756 is greater than the threshold. (35) between the feature vector based on: (a) the position 730 and (b) the position 740 and the feature vector based on: (a) the position 748 and (b) the position 758 is greater than the threshold, and (36) between the feature vector based on: (a) the position 730 and (b) the position 740 and the feature vector based on: (a) the position 750 and (b) the position 760 is less than the threshold.

Returning to FIG. 8, for example, the production module 808 can include instructions that function to control the processor 802 to produce, based on the results of the data association operations, a digital map of the location.

Figure 14:
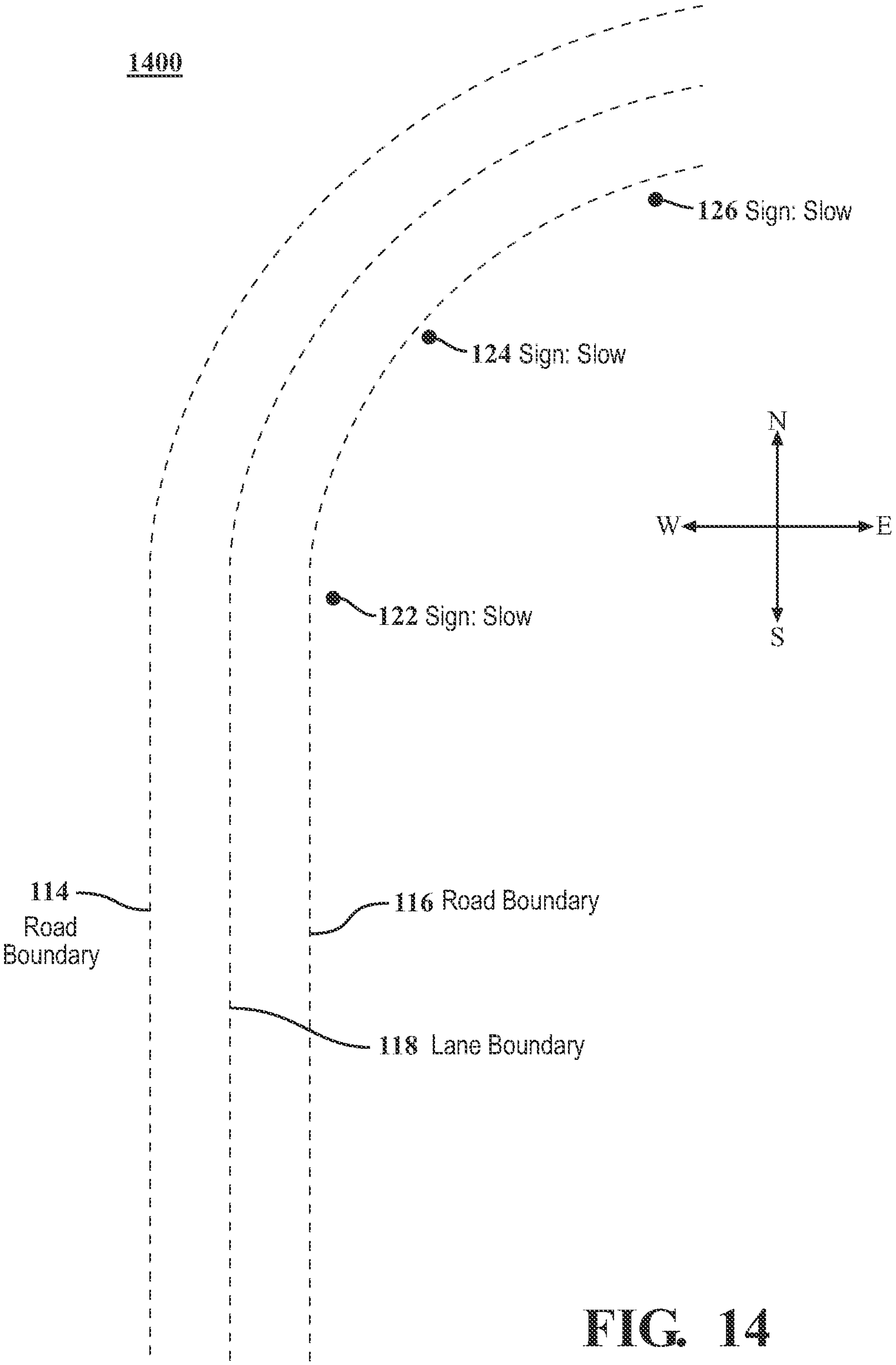
FIG. 14 includes an example of a digital map, according to the disclosed technologies.

FIG. 14 includes an example of a digital map 1400, according to the disclosed technologies. For example, the digital map 1400 can include representations of the position of: (1) the road boundary 114 (based on the position 726, the position 736, the position 746, and the position 756), (2) the road boundary 116 (based on the position 728, the position 738, the position 748, and the position 758), (3) the lane boundary 118 (based on the position 730, the position 740, the position 750, and the position 760), (4) the first road sign 122 (based on the position 722 and the position 742), (5) the second road sign 124 (based on the position 724, the position 732, the position 744, and the position 752), and (6) the third road sign 126 (based on the position 734 and the position 754).

Returning to FIG. 8, for example, the communications module 810 can include instructions that function to control the processor 802 to transmit the digital map to a specific vehicle to be used to control a movement of the specific vehicle. With reference to FIG. 1, for example, the instructions to cause the processor 802 to transmit the digital map can cause the communications device 156 included in the system 154 to transmit the digital map to the communications device 152 disposed on the fourth vehicle 134.

Returning to FIG. 8, additionally, for example, the memory 804 can further store a training module 812. For example, the training module 812 can include instructions that function to control the processor 802 to perform a training operation on a neural network associated with the machine learning technique. For example, if the neural network is a Siamese neural network, then the training module 812 can include instructions that function to control the processor 802 to perform a training operation on the Siamese neural network. For example, the first set of information can be a training set of information. For example, a position of the pose of the camera that produced the first image can be based on high-precision proprioception information affiliated with the camera that produced the first image. For example, the high-precision proprioception information can have been produced by a real-time kinematic (RTK) global navigation satellite system (GNSS) affiliated with the camera that produced the first image. For example, the RTK GNSS can indicate a position of the camera that produced the first image with a degree of accuracy that is within a centimeter. By using the RTK GNSS to indicate the position of the camera that produced the first image, the first set of information can serve as ground truth so that the training operation on the neural network (e.g., the Siamese neural network) can be performed in a self-supervised manner.

With reference to FIG. 2, in a performance of the training operation according to the first implementation, for example: (1) the first image can be the image 200 produced, at the first time ($t_1$), by the forward-facing camera 140 attached to the first vehicle 128 and (2) the second image can be the image 200 produced, at the fifth time ($t_5$), by the forward-facing camera 144 attached to the third vehicle 132.

With reference to FIG. 7, for example: (1) the first set of positions can include: (a) the position 702. (b) the position 704, (c) the position 706, (d) the position 708, and (e) the position 710; and (2) the second set of positions can include: (a) the position 742. (b) the position 744, (c) the position 746, (d) the position 748, and (e) the position 750.

With reference to FIGS. 2 and 3, in a performance of the training operation according to the second implementation, for example: (1) the first image can be the image 200 produced, at the first time ($t_1$), by the forward-facing camera 140 attached to the first vehicle 128 and (2) the second image can be the image 300 produced, at the fourth time ($t_4$), by the forward-facing camera 142 attached to the second vehicle 130.

With reference to FIG. 7, for example: (1) the first set of positions can include: (a) the position 702. (b) the position 704, (c) the position 706, (d) the position 708, and (e) the position 710; and (2) the second set of positions can include: (a) the position 732, (b) the position 734, (c) the position 736, (d) the position 738, and (e) the position 740.

With reference to FIG. 2, in a performance of the training operation according to the third implementation, for example: (1) the first image can be the image 200 produced, at the first time ($t_1$), by the forward-facing camera 140 attached to the first vehicle 128 and (2) the second image can be the image 200 produced, at the fifth time ($t_5$), by the forward-facing camera 144 attached to the third vehicle 132.

With reference to FIG. 7, for example: (1) the first set of positions can include: (a) the position 702, (b) the position 704, (c) the position 706, (d) the position 708, and (e) the position 710; and (2) the second set of positions can include: (a) the position 742, (b) the position 744, (c) the position 746, (d) the position 748, and (e) the position 750.

With reference to FIGS. 2 and 3, in a performance of the training operation according to the fourth implementation, for example: (1) the earlier first image can be the image 200 produced, at the first time ($t_1$), by the forward-facing camera 140 attached to the first vehicle 128, (2) the later first image can be the image 300 produced, at the second time ($t_2$), by the forward-facing camera 140 attached to the first vehicle 128, (3) the earlier second image can be the image 200 produced, at the fifth time ($t_5$), by the forward-facing camera 144 attached to the third vehicle 132, and (4) the later second image can be the image 300 produced, at the sixth time ($t_6$), by the forward-facing camera 144 attached to the third vehicle 132.

With reference to FIG. 7, for example: (1) the earlier first set of positions can include: (a) the position 702, (b) the position 704, (c) the position 706, (d) the position 708, and (e) the position 710; (2) the later first set of positions can include: (a) the position 712, (b) the position 714, (c) the position 716, (d) the position 718, and (e) the position 720; (3) the earlier second set of positions can include: (a) the position 742, (b) the position 744, (c) the position 746, (d) the position 748, and (e) the position 750; and (4) the later second set of positions can include: (a) the position 752. (b) the position 754, (c) the position 756, (d) the position 758, and (e) the position 760.

Figure 15:
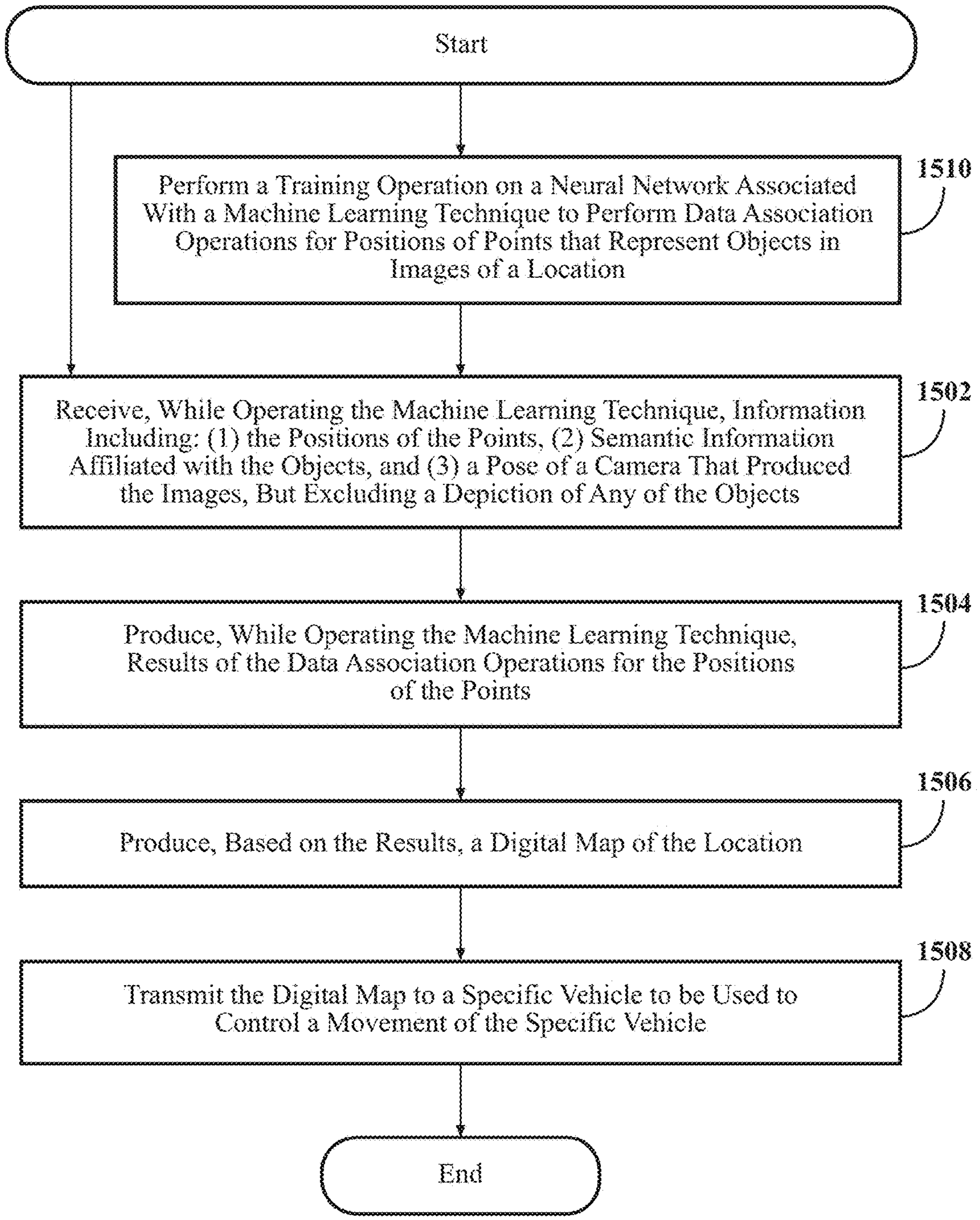
FIG. 15 includes a flow diagram that illustrates an example of a method that is associated with using a machine learning technique to perform data association operations for positions of points that represent objects in images of a location, according to the disclosed technologies.

FIG. 15 includes a flow diagram that illustrates an example of a method 1500 that is associated with using a machine learning technique to perform data association operations for positions of points that represent objects in images of a location, according to the disclosed technologies. Although the method 1500 is described in combination with the system 800 illustrated in FIG. 8, one of skill in the art understands, in light of the description herein, that the method 1500 is not limited to being implemented by the system 800 illustrated in FIG. 8. Rather, the system 800 illustrated in FIG. 8 is an example of a system that may be used to implement the method 1500. Additionally, although the method 1500 is illustrated as a generally serial process, various aspects of the method 1500 may be able to be executed in parallel.

In the method 1500, at an operation 1502, for example, the machine learning module 806, while operating the machine learning technique, can receive information. The information can: (1) include the positions of the points that represent the objects in the images of the location and (2) include a pose of a camera that produced the images, but (3) exclude a depiction of any of the objects. For example, the points can include keypoints. For example, the information can further include semantic information affiliated with the objects.

For example, in the operation 1502, the machine learning module 806 can receive, from a set of vehicles, the information. For example, the pose of the camera can include a set of poses from a set of cameras.

For example, in the operation 1502, the machine learning module 806 can receive, from a vehicle of the set of vehicles and at a specific communication rate, at least some of the information. For example, the specific communication rate can be once per thirty seconds. For example, the information can be determined by an automated driving system of active safety technologies and advanced driver assistance systems (ADAS). For example, the automated driving system can be a third generation of the Toyota Safety Sense™ system (TSS3). For example, an amount the information, for an image of the images, can be about 300 bytes. For example, the camera can be a component in a lane keeping assist (LKA) system. For example, the images produced by the camera can be produced at a specific production rate. For example, the specific production rate can be ten hertz.

At an operation 1504, for example, the machine learning module 806, while operating the machine learning technique, can produce results of the data association operations for the positions of the points.

For example, the machine learning technique can use a Siamese neural network. A Siamese neural network can be an artificial neural network configured to include a first sub-network and a second sub-network. The first sub-network and the second sub-network can be configured to have the same weights applied to corresponding nodes and to operate in parallel. Each of the first sub-network and the second sub-network can be configured to receive an input and to produce an output. The Siamese neural network can be configured to determine a relationship between an output of the first sub-network and an output of the second sub-network. For example, the relationship can be a value of a contrastive loss function of a measurement of the output of the first sub-network and a measurement of the output of the second sub-network.

For example, the images can include a first image and a second image. The information can include a first set of information and a second set of information. The first set of information can include: (1) a first set of positions and (2) the pose of the camera that produced the first image. The first set of positions can be of the points that represent the objects in the first image. The second set of information can include: (1) a second set of positions and (2) the pose of the camera that produced the second image. The second set of positions can be of the points that represent the objects in the second image. For example, in the operation 1502, the machine learning module 806, while operating the machine learning technique, can: (1) receive, by a first sub-network of the Siamese neural network, the first set of positions and (2) receive, by a second sub-network of the Siamese neural network, the second set of positions. For example, in the operation 1504, the machine learning module 806, while operating the machine learning technique, can determine a relationship between a measurement of an output of the first sub-network and a measurement of an output of the second sub-network.

In a first implementation, for example, in the operation 1504, the machine learning module 806, while operating the machine learning technique, can determine a value of a contrastive loss function of the measurement of the output of the first sub-network and the measurement of the output of the second sub-network.

For example: (1) the measurement of the output of the first sub-network can be a measurement of a specific position of the first set of positions, (2) the measurement of the output of the second sub-network can be a measurement of a specific position of the second set of positions, and (3) in response to the value of the contrastive loss function being less than a threshold, the specific position, of the first set of positions, can be considered to be associated with the specific position of second set of positions.

Additionally or alternatively, for example: (1) a position of the pose of the camera that produced the first image can be based on proprioception information affiliated with the camera that produced the first image, (2) a position of the pose of the camera that produced the second image can be based on proprioception information affiliated with the camera that produced the second image, and (3) the contrastive loss function can includes: (a) the position of the pose of the camera that produced the first image and (b) the position of the pose of the camera that produced the second image.

In a second implementation, for example: (1) the first image can have been produced at a first time and (2) the second image can have been produced at a second time. For example: (1) the first image produced at the first time can be a first keyframe and (2) the second image produced at the second time can be a second keyframe. For example, in the operation 1502, the machine learning module 806, while operating the machine learning technique, can: (1) receive, by the first sub-network, a first set of feature vectors based on the first set of positions and (2) receive, by the second sub-network, a second set of feature vectors based on the second set of positions. A feature vector can include, for example, feature information about an object represented by a point at a position.

In a third implementation, for example: (1) the camera can include a first camera and a second camera, (2) the first camera produced the first image, and (3) the second camera produced the second image. For example, in the operation 1502, the machine learning module 806, while operating the machine learning technique, can: (1) receive, by the first sub-network, a first set of structural information based on the first set of positions and (2) receive, by the second sub-network, a second set of structural information based on the second set of positions. An item of structural information around a point, that represents an object and has a position, can be encoded.

In a fourth implementation, for example: (1) the first image can include an earlier first image and a later first image and (2) the second image can include an earlier second image and a later second image. For example, the first set of positions can include: (1) an earlier first set of positions and (2) a later first set of positions. For example, the second set of positions can include: (1) an earlier second set of positions and (2) a later second set of positions. For example, in the operation 1502, the machine learning module 806, while operating the machine learning technique, can: (1) receive, by the first sub-network, a first set of feature vectors based on the earlier first set of positions and the later first set of positions and (2) receive, by the second sub-network, a second set of feature vectors based on the earlier second set of positions and the later second set of positions.

At an operation 1506, for example, the production module 808 can produce, based on the results of the data association operations, a digital map of the location.

At an operation 1508, for example, the communications module 810 can transmit the digital map to a specific vehicle to be used to control a movement of the specific vehicle.

Additionally, at an operation 1510, for example, the training module 812 can perform a training operation on a neural network associated with the machine learning technique. For example, if the neural network is a Siamese neural network, then the training module 812 can perform a training operation on the Siamese neural network. For example, the first set of information can be a training set of information. For example, a position of the pose of the camera that produced the first image can be based on high-precision proprioception information affiliated with the camera that produced the first image. For example, the high-precision proprioception information can have been produced by a real-time kinematic (RTK) global navigation satellite system (GNSS) affiliated with the camera that produced the first image. For example, the RTK GNSS can indicate a position of the camera that produced the first image with a degree of accuracy that is within a centimeter. By using the RTK GNSS to indicate the position of the camera that produced the first image, the first set of information can serve as ground truth so that the training operation on the neural network (e.g., the Siamese neural network) can be performed in a self-supervised manner.

Figure 16:
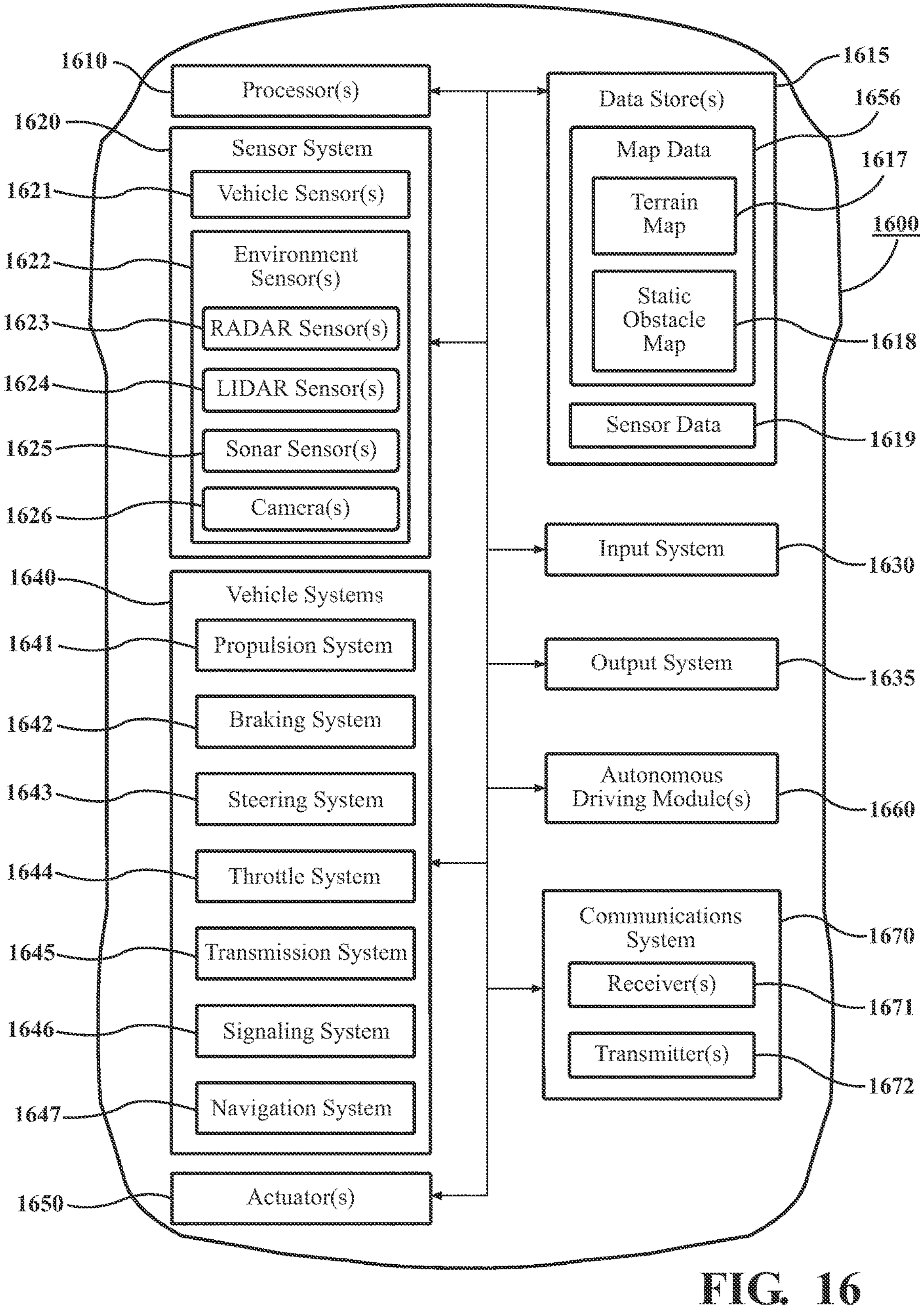
FIG. 16 includes a block diagram that illustrates an example of elements disposed on a vehicle, according to the disclosed technologies.

FIG. 16 includes a block diagram that illustrates an example of elements disposed on a vehicle 1600, according to the disclosed technologies. As used herein, a "vehicle" can be any form of powered transport. In one or more implementations, the vehicle 1600 can be an automobile. While arrangements described herein are with respect to automobiles, one of skill in the art understands, in light of the description herein, that embodiments are not limited to automobiles. For example, functions and/or operations of one or more of the first vehicle 128 (illustrated in FIG. 1), the second vehicle 130 (illustrated in FIG. 1), the third vehicle 132 (illustrated in FIG. 1), or the fourth vehicle 134 (illustrated in FIG. 1) can be realized by the vehicle 1600.

In some embodiments, the vehicle 1600 can be configured to switch selectively between an automated mode, one or more semi-automated operational modes, and/or a manual mode. Such switching can be implemented in a suitable manner, now known or later developed. As used herein, "manual mode" can refer that all of or a majority of the navigation and/or maneuvering of the vehicle 1600 is performed according to inputs received from a user (e.g., human driver). In one or more arrangements, the vehicle 1600 can be a conventional vehicle that is configured to operate in only a manual mode.

In one or more embodiments, the vehicle 1600 can be an automated vehicle. As used herein, "automated vehicle" can refer to a vehicle that operates in an automated mode. As used herein, "automated mode" can refer to navigating and/or maneuvering the vehicle 1600 along a travel route using one or more computing systems to control the vehicle 1600 with minimal or no input from a human driver. In one or more embodiments, the vehicle 1600 can be highly automated or completely automated. In one embodiment, the vehicle 1600 can be configured with one or more semi-automated operational modes in which one or more computing systems perform a portion of the navigation and/or maneuvering of the vehicle along a travel route, and a vehicle operator (i.e., driver) provides inputs to the vehicle 1600 to perform a portion of the navigation and/or maneuvering of the vehicle 1600 along a travel route.

For example, Standard J3016 202104, Taxonomy and Definitions for Terms Related to Driving Automation Systems for On-Road Motor Vehicles, issued by the Society of Automotive Engineers (SAE) International on Jan. 16, 2014, and most recently revised on Apr. 30, 2021, defines six levels of driving automation. These six levels include: (1) level 0, no automation, in which all aspects of dynamic driving tasks are performed by a human driver; (2) level 1, driver assistance, in which a driver assistance system, if selected, can execute, using information about the driving environment, either steering or acceleration/deceleration tasks, but all remaining driving dynamic tasks are performed by a human driver; (3) level 2, partial automation, in which one or more driver assistance systems, if selected, can execute, using information about the driving environment, both steering and acceleration/deceleration tasks, but all remaining driving dynamic tasks are performed by a human driver; (4) level 3, conditional automation, in which an automated driving system, if selected, can execute all aspects of dynamic driving tasks with an expectation that a human driver will respond appropriately to a request to intervene; (5) level 4, high automation, in which an automated driving system, if selected, can execute all aspects of dynamic driving tasks even if a human driver does not respond appropriately to a request to intervene; and (6) level 5, full automation, in which an automated driving system can execute all aspects of dynamic driving tasks under all roadway and environmental conditions that can be managed by a human driver.

The vehicle 1600 can include various elements. The vehicle 1600 can have any combination of the various elements illustrated in FIG. 16. In various embodiments, it may not be necessary for the vehicle 1600 to include all of the elements illustrated in FIG. 16. Furthermore, the vehicle 1600 can have elements in addition to those illustrated in FIG. 16. While the various elements are illustrated in FIG. 16 as being located within the vehicle 1600, one or more of these elements can be located external to the vehicle 1600. Furthermore, the elements illustrated may be physically separated by large distances. For example, as described, one or more components of the disclosed system can be implemented within the vehicle 1600 while other components of the system can be implemented within a cloud-computing environment, as described below. For example, the elements can include one or more processors 1610, one or more data stores 1615, a sensor system 1620, an input system 1630, an output system 1635, vehicle systems 1640, one or more actuators 1650, one or more automated driving modules 1660, a communications system 1670.

In one or more arrangements, the one or more processors 1610 can be a main processor of the vehicle 1600. For example, the one or more processors 1610 can be an electronic control unit (ECU).

The one or more data stores 1615 can store, for example, one or more types of data. The one or more data stores 1615 can include volatile memory and/or non-volatile memory. Examples of suitable memory for the one or more data stores 1615 can include Random-Access Memory (RAM), flash memory, Read-Only Memory (ROM), Programmable Read-Only Memory (PROM), Erasable Programmable Read-Only Memory (EPROM), Electrically Erasable Programmable Read-Only Memory (EEPROM), registers, magnetic disks, optical disks, hard drives, any other suitable storage medium, or any combination thereof. The one or more data stores 1615 can be a component of the one or more processors 1610. Additionally or alternatively, the one or more data stores 1615 can be operatively connected to the one or more processors 1610 for use thereby. As used herein, "operatively connected" can include direct or indirect connections, including connections without direct physical contact. As used herein, a statement that a component can be "configured to" perform an operation can be understood to mean that the component requires no structural alterations, but merely needs to be placed into an operational state (e.g., be provided with electrical power, have an underlying operating system running, etc.) in order to perform the operation.

In one or more arrangements, the one or more data stores 1615 can store map data 1616. The map data 1616 can include maps of one or more geographic areas. In some instances, the map data 1616 can include information or data on roads, traffic control devices, road markings, structures, features, and/or landmarks in the one or more geographic areas. The map data 1616 can be in any suitable form. In some instances, the map data 1616 can include aerial views of an area. In some instances, the map data 1616 can include ground views of an area, including 360-degree ground views. The map data 1616 can include measurements, dimensions, distances, and/or information for one or more items included in the map data 1616 and/or relative to other items included in the map data 1616. The map data 1616 can include a digital map with information about road geometry. The map data 1616 can be high quality and/or highly detailed. For example, functions and/or operations of one or more of the digital map 1400 (illustrated in FIG. 14) can be realized by the map data 1616.

In one or more arrangements, the map data 1616 can include one or more terrain maps 1617. The one or more terrain maps 1617 can include information about the ground, terrain, roads, surfaces, and/or other features of one or more geographic areas. The one or more terrain maps 1617 can include elevation data of the one or more geographic areas. The map data 1616 can be high quality and/or highly detailed. The one or more terrain maps 1617 can define one or more ground surfaces, which can include paved roads, unpaved roads, land, and other things that define a ground surface.

In one or more arrangements, the map data 1616 can include one or more static obstacle maps 1618. The one or more static obstacle maps 1618 can include information about one or more static obstacles located within one or more geographic areas. A "static obstacle" can be a physical object whose position does not change (or does not substantially change) over a period of time and/or whose size does not change (or does not substantially change) over a period of time. Examples of static obstacles can include trees, buildings, curbs, fences, railings, medians, utility poles, statues, monuments, signs, benches, furniture, mailboxes, large rocks, and hills. The static obstacles can be objects that extend above ground level. The one or more static obstacles included in the one or more static obstacle maps 1618 can have location data, size data, dimension data, material data, and/or other data associated with them. The one or more static obstacle maps 1618 can include measurements, dimensions, distances, and/or information for one or more static obstacles. The one or more static obstacle maps 1618 can be high quality and/or highly detailed. The one or more static obstacle maps 1618 can be updated to reflect changes within a mapped area.

In one or more arrangements, the one or more data stores 1615 can store sensor data 1619. As used herein, "sensor data" can refer to any information about the sensors with which the vehicle 1600 can be equipped including the capabilities of and other information about such sensors. The sensor data 1619 can relate to one or more sensors of the sensor system 1620. For example, in one or more arrangements, the sensor data 1619 can include information about one or more lidar sensors 1624 of the sensor system 1620.

In some arrangements, at least a portion of the map data 1616 and/or the sensor data 1619 can be located in one or more data stores 1615 that are located onboard the vehicle 1600. Additionally or alternatively, at least a portion of the map data 1616 and/or the sensor data 1619 can be located in one or more data stores 1615 that are located remotely from the vehicle 1600.

The sensor system 1620 can include one or more sensors. As used herein, a "sensor" can refer to any device, component, and/or system that can detect and/or sense something. The one or more sensors can be configured to detect and/or sense in real-time. As used herein, the term "real-time" can refer to a level of processing responsiveness that is perceived by a user or system to be sufficiently immediate for a particular process or determination to be made, or that enables the processor to keep pace with some external process.

In arrangements in which the sensor system 1620 includes a plurality of sensors, the sensors can work independently from each other. Alternatively, two or more of the sensors can work in combination with each other. In such a case, the two or more sensors can form a sensor network. The sensor system 1620 and/or the one or more sensors can be operatively connected to the one or more processors 1610, the one or more data stores 1615, and/or another element of the vehicle 1600 (including any of the elements illustrated in FIG. 16). The sensor system 1620 can acquire data of at least a portion of the external environment of the vehicle 1600

(e.g., nearby vehicles). The sensor system 1620 can include any suitable type of sensor. Various examples of different types of sensors are described herein. However, one of skill in the art understands that the embodiments are not limited to the particular sensors described herein.

The sensor system 1620 can include one or more vehicle sensors 1621. The one or more vehicle sensors 1621 can detect, determine, and/or sense information about the vehicle 1600 itself. In one or more arrangements, the one or more vehicle sensors 1621 can be configured to detect and/or sense position and orientation changes of the vehicle 1600 such as, for example, based on inertial acceleration. In one or more arrangements, the one or more vehicle sensors 1621 can include one or more accelerometers, one or more gyroscopes, an inertial measurement unit (IMU), a dead-reckoning system, a global navigation satellite system (GNSS), a global positioning system (GPS), a navigation system 1647, and/or other suitable sensors. For example, functions and/or operations of the real-time kinematic (RTK) global navigation satellite system (GNSS) receiver 138 (illustrated in FIG. 1) can be realized by the one or more vehicle sensors 1621. The one or more vehicle sensors 1621 can be configured to detect and/or sense one or more characteristics of the vehicle 1600. In one or more arrangements, the one or more vehicle sensors 1621 can include a speedometer to determine a current speed of the vehicle 1600.

Additionally or alternatively, the sensor system 1620 can include one or more environment sensors 1622 configured to acquire and/or sense driving environment data. As used herein, "driving environment data" can include data or information about the external environment in which a vehicle is located or one or more portions thereof. For example, the one or more environment sensors 1622 can be configured to detect, quantify, and/or sense obstacles in at least a portion of the external environment of the vehicle 1600 and/or information/data about such obstacles. Such obstacles may be stationary objects and/or dynamic objects. The one or more environment sensors 1622 can be configured to detect, measure, quantify, and/or sense other things in the external environment of the vehicle 1600 such as, for example, lane markers, signs, traffic lights, traffic signs, lane lines, crosswalks, curbs proximate the vehicle 1600, off-road objects, etc.

Various examples of sensors of the sensor system 1620 are described herein. The example sensors may be part of the one or more vehicle sensors 1621 and/or the one or more environment sensors 1622. However, one of skill in the art understands that the embodiments are not limited to the particular sensors described.

In one or more arrangements, the one or more environment sensors 1622 can include one or more radar sensors 1623, one or more lidar sensors 1624, one or more sonar sensors 1625, and/or one more cameras 1626. In one or more arrangements, the one or more cameras 1626 can be one or more high dynamic range (HDR) cameras or one or more infrared (IR) cameras. For example, the one or more cameras 1626 can be used to record a reality of a state of an item of information that can appear in the digital map. For example, functions and/or operations of the forward-facing camera 140 (illustrated in FIG. 1), the forward-facing camera 142 (illustrated in FIG. 1), or the forward-facing camera 144 (illustrated in FIG. 1) can be realized by the one or more cameras 1626.

The input system 1630 can include any device, component, system, element, arrangement, or groups thereof that enable information/data to be entered into a machine. The input system 1630 can receive an input from a vehicle passenger (e.g., a driver or a passenger). The output system 1635 can include any device, component, system, element, arrangement, or groups thereof that enable information/data to be presented to a vehicle passenger (e.g., a driver or a passenger).

Various examples of the one or more vehicle systems 1640 are illustrated in FIG. 16. However, one of skill in the art understands that the vehicle 1600 can include more, fewer, or different vehicle systems. Although particular vehicle systems can be separately defined, each or any of the systems or portions thereof may be otherwise combined or segregated via hardware and/or software within the vehicle 1600. For example, the one or more vehicle systems 1640 can include a propulsion system 1641, a braking system 1642, a steering system 1643, a throttle system 1644, a transmission system 1645, a signaling system 1646, and/or the navigation system 1647. Each of these systems can include one or more devices, components, and/or a combination thereof, now known or later developed.

The navigation system 1647 can include one or more devices, applications, and/or combinations thereof, now known or later developed, configured to determine the geographic location of the vehicle 1600 and/or to determine a travel route for the vehicle 1600. The navigation system 1647 can include one or more mapping applications to determine a travel route for the vehicle 1600. The navigation system 1647 can include a global positioning system, a local positioning system, a geolocation system, and/or a combination thereof.

The one or more actuators 1650 can be any element or combination of elements operable to modify, adjust, and/or alter one or more of the vehicle systems 1640 or components thereof responsive to receiving signals or other inputs from the one or more processors 1610 and/or the one or more automated driving modules 1660. Any suitable actuator can be used. For example, the one or more actuators 1650 can include motors, pneumatic actuators, hydraulic pistons, relays, solenoids, and/or piezoelectric actuators.

The one or more processors 1610 and/or the one or more automated driving modules 1660 can be operatively connected to communicate with the various vehicle systems 1640 and/or individual components thereof. For example, the one or more processors 1610 and/or the one or more automated driving modules 1660 can be in communication to send and/or receive information from the various vehicle systems 1640 to control the movement, speed, maneuvering, heading, direction, etc. of the vehicle 1600. The one or more processors 1610 and/or the one or more automated driving modules 1660 may control some or all of these vehicle systems 1640 and, thus, may be partially or fully automated.

The one or more processors 1610 and/or the one or more automated driving modules 1660 may be operable to control the navigation and/or maneuvering of the vehicle 1600 by controlling one or more of the vehicle systems 1640 and/or components thereof. For example, when operating in an automated mode, the one or more processors 1610 and/or the one or more automated driving modules 1660 can control the direction and/or speed of the vehicle 1600. The one or more processors 1610 and/or the one or more automated driving modules 1660 can cause the vehicle 1600 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" can mean to make, force, compel, direct, command, instruct, and/or enable an event or action to occur or at least be in a state where such event or action may occur, either in a direct or indirect manner. The communications system 1670 can include one or more receivers 1671 and/or one or more transmitters 1672. The communications system 1670 can receive and transmit one or more messages through one or more wireless communications channels. For example, the one or more wireless communications channels can be in accordance with the Institute of Electrical and Electronics Engineers (IEEE) 802.11p standard to add wireless access in vehicular environments (WAVE) (the basis for Dedicated Short-Range Communications (DSRC)), the 3rd Generation Partnership Project (3GPP) Long-Term Evolution (LTE) Vehicle-to-Everything (V2X) (LTE-V2X) standard (including the LTE Uu interface between a mobile communication device and an Evolved Node B of the Universal Mobile Telecommunications System), the 3GPP fifth generation (5G) New Radio (NR) Vehicle-to-Everything (V2X) standard (including the 5G NR Uu interface), or the like. For example, the communications system 1670 can include "connected vehicle" technology. "Connected vehicle" technology can include, for example, devices to exchange communications between a vehicle and other devices in a packet-switched network. Such other devices can include, for example, another vehicle (e.g., "Vehicle to Vehicle" (V2V) technology), roadside infrastructure (e.g., "Vehicle to Infrastructure" (V2I) technology), a cloud platform (e.g., "Vehicle to Cloud" (V2C) technology), a pedestrian (e.g., "Vehicle to Pedestrian" (V2P) technology), or a network (e.g., "Vehicle to Network" (V2N) technology. "Vehicle to Everything" (V2X) technology can integrate aspects of these individual communications technologies. For example, functions and/or operations of the communications device 146 (illustrated in FIG. 1), the communications device 148 (illustrated in FIG. 1), the communications device 150 (illustrated in FIG. 1), or the communications device 152 (illustrated in FIG. 1) can be realized by the communications system 1670.

Moreover, the one or more processors 1610, the one or more data stores 1615, and the communications system 1670 can be configured to one or more of form a micro cloud, participate as a member of a micro cloud, or perform a function of a leader of a mobile micro cloud. A micro cloud can be characterized by a distribution, among members of the micro cloud, of one or more of one or more computing resources or one or more data storage resources in order to collaborate on executing operations. The members can include at least connected vehicles.

The vehicle 1600 can include one or more modules, at least some of which are described herein. The modules can be implemented as computer-readable program code that, when executed by the one or more processors 1610, implement one or more of the various processes described herein. One or more of the modules can be a component of the one or more processors 1610. Additionally or alternatively, one or more of the modules can be executed on and/or distributed among other processing systems to which the one or more processors 1610 can be operatively connected. The modules can include instructions (e.g., program logic) executable by the one or more processors 1610. Additionally or alternatively, the one or more data store 1615 may contain such instructions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The vehicle 1600 can include one or more automated driving modules 1660. The one or more automated driving modules 1660 can be configured to receive data from the sensor system 1620 and/or any other type of system capable of capturing information relating to the vehicle 1600 and/or the external environment of the vehicle 1600. In one or more arrangements, the one or more automated driving modules 1660 can use such data to generate one or more driving scene models. The one or more automated driving modules 1660 can determine position and velocity of the vehicle 1600. The one or more automated driving modules 1660 can determine the location of obstacles, obstacles, or other environmental features including traffic signs, trees, shrubs, neighboring vehicles, pedestrians, etc.

The one or more automated driving modules 1660 can be configured to receive and/or determine location information for obstacles within the external environment of the vehicle 1600 for use by the one or more processors 1610 and/or one or more of the modules described herein to estimate position and orientation of the vehicle 1600, vehicle position in global coordinates based on signals from a plurality of satellites, or any other data and/or signals that could be used to determine the current state of the vehicle 1600 or determine the position of the vehicle 1600 with respect to its environment for use in either creating a map or determining the position of the vehicle 1600 in respect to map data.

The one or more automated driving modules 1660 can be configured to determine one or more travel paths, current automated driving maneuvers for the vehicle 1600, future automated driving maneuvers and/or modifications to current automated driving maneuvers based on data acquired by the sensor system 1620, driving scene models, and/or data from any other suitable source such as determinations from the sensor data 1619. As used herein, "driving maneuver" can refer to one or more actions that affect the movement of a vehicle. Examples of driving maneuvers include: accelerating, decelerating, braking, turning, moving in a lateral direction of the vehicle 1600, changing travel lanes, merging into a travel lane, and/or reversing, just to name a few possibilities. The one or more automated driving modules 1660 can be configured to implement determined driving maneuvers. The one or more automated driving modules 1660 can cause, directly or indirectly, such automated driving maneuvers to be implemented. As used herein, "cause" or "causing" means to make, command, instruct, and/or enable an event or action to occur or at least be in a state where such event or action may occur, either in a direct or indirect manner. The one or more automated driving modules 1660 can be configured to execute various vehicle functions and/or to transmit data to, receive data from, interact with, and/or control the vehicle 1600 or one or more systems thereof (e.g., one or more of vehicle systems 1640). For example, functions and/or operations of an automotive navigation system can be realized by the one or more automated driving modules 1660.

Detailed embodiments are disclosed herein. However, one of skill in the art understands, in light of the description herein, that the disclosed embodiments are intended only as examples. Therefore, specific structural and functional details disclosed herein are not to be interpreted as limiting, but merely as a basis for the claims and as a representative basis for teaching one of skill in the art to variously employ the aspects herein in virtually any appropriately detailed structure. Furthermore, the terms and phrases used herein are not intended to be limiting but rather to provide an understandable description of possible implementations. Various embodiments are illustrated in FIGS. 1-5, 6A-6C, and 7-16, but the embodiments are not limited to the illustrated structure or application.

The flowchart and block diagrams in the figures illustrate the architecture, functionality, and operation of possible implementations of systems, methods, and computer program products according to various embodiments. In this regard, each block in flowcharts or block diagrams may represent a module, segment, or portion of code, which comprises one or more executable instructions for implementing the specified logical function(s). One of skill in the art understands, in light of the description herein, that, in some alternative implementations, the functions described in a block may occur out of the order depicted by the figures. For example, two blocks depicted in succession may, in fact, be executed substantially concurrently, or the blocks may be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suitable. A typical combination of hardware and software can be a processing system with computer-readable program code that, when loaded and executed, controls the processing system such that it carries out the methods described herein. The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product that comprises all the features enabling the implementation of the methods described herein and that, when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. As used herein, the phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples of the computer-readable storage medium would include, in a non-exhaustive list, the following: a portable computer diskette, a hard disk drive (HDD), a solid-state drive (SSD), a read-only memory (ROM), an erasable programmable read-only memory (EPROM or flash memory), a portable compact disc read-only memory (CD-ROM), a digital versatile disc (DVD), an optical storage device, a magnetic storage device, or any suitable combination of the foregoing. As used herein, a computer-readable storage medium may be any tangible medium that can contain or store a program for use by or in connection with an instruction execution system, apparatus, or device.

Generally, modules, as used herein, include routines, programs, objects, components, data structures, and so on that perform particular tasks or implement particular data types. In further aspects, a memory generally stores such modules. The memory associated with a module may be a buffer or may be cache embedded within a processor, a random-access memory (RAM), a ROM, a flash memory, or another suitable electronic storage medium. In still further aspects, a module as used herein, may be implemented as an application-specific integrated circuit (ASIC), a hardware component of a system on a chip (SoC), a programmable logic array (PLA), or another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the disclosed technologies may be written in any combination of one or more programming languages, including an object-oriented programming language such as Java™, Smalltalk, C++, or the like, and conventional procedural programming languages such as the "C" programming language or similar programming languages. The program code may execute entirely on a user's computer, partly on a user's computer, as a stand-alone software package, partly on a user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . or . . . " as used herein refers to and encompasses any and all possible combinations of one or more of the associated listed items. For example, the phrase "at least one of A, B, or C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system, comprising:
- a processor; and
- a memory storing:
  - a machine learning module including instructions that, when executed by the processor operating a machine learning technique, cause the processor to:
    - receive information, the information:
      - including:
        - positions of points that represent objects in images of a location,
        - semantic information affiliated with the objects, and
        - a pose of a camera that produced the images, but
      - excluding a depiction of any of the objects; and
    - produce results of data association operations for the positions of the points;

a production module including instructions that, when executed by the processor, cause the processor to produce, based on the results, a digital map of the location; and a communications module including instructions that, when executed by the processor, cause the processor to transmit the digital map to a specific vehicle to be used to control a movement of the specific vehicle.

2. The system of claim 1, wherein the machine learning technique uses a Siamese neural network.

3. The system of claim 2, wherein:

the images comprise a first image and a second image, the information comprises a first set of information and a second set of information, the first set of information includes:

a first set of positions, the first set of positions being of the points that represent the objects in the first image, and the pose of the camera that produced the first image, and the second set of information includes:

a second set of positions, the second set of positions being of the points that represent the objects in the second image, and the pose of the camera that produced the second image, the instructions to receive include instructions:

to receive, by a first sub-network of the Siamese neural network, the first set of positions, and to receive, by a second sub-network of the Siamese neural network, the second set of positions, and the instructions to produce the results include instructions to determine a relationship between a measurement of an output of the first sub-network and a measurement of an output of the second sub-network.

4. The system of claim 3, wherein the instructions to determine the relationship include instructions to determine a value of a contrastive loss function of the measurement of the output of the first sub-network and the measurement of the output of the second sub-network.

5. The system of claim 4, wherein:

the measurement of the output of the first sub-network is a measurement of a specific position of the first set of positions, the measurement of the output of the second sub-network is a measurement of a specific position of the second set of positions, and in response to the value of the contrastive loss function being less than a threshold, the specific position, of the first set of positions, is considered to be associated with the specific position of second set of positions.

6. The system of claim 4, wherein:

a position of the pose of the camera that produced the first image is based on proprioception information affiliated with the camera that produced the first image, a position of the pose of the camera that produced the second image is based on proprioception information affiliated with the camera that produced the second image, and the contrastive loss function includes:

the position of the pose of the camera that produced the first image, and the position of the pose of the camera that produced the second image.

7. The system of claim 3, wherein:

the first image was produced at a first time, and the second image was produced at a second time.

8. The system of claim 7, wherein the instructions to receive include instructions:

to receive, by the first sub-network, a first set of feature vectors based on the first set of positions, and to receive, by the second sub-network, a second set of feature vectors based on the second set of positions.

9. The system of claim 7, wherein:

the first image was produced at the first time is a first keyframe, and the second image was produced at the second time is a second keyframe.

10. The system of claim 3, wherein:

the camera comprises a first camera and a second camera, the first camera produced the first image, and the second camera produced the second image.

11. The system of claim 10, wherein the instructions to receive include instructions:

to receive, by the first sub-network, a first set of structural information based on the first set of positions, and to receive, by the second sub-network, a second set of structural information based on the second set of positions.

12. The system of claim 10, wherein:

the first image comprises an earlier first image and a later first image, the second image comprises an earlier second image and a later second image, the first set of positions comprises an earlier first set of positions and a later first set of positions, the second set of positions comprises an earlier second set of positions and a later second set of positions, and the instructions to receive include instructions:

to receive, by the first sub-network, a first set of feature vectors based on the earlier first set of positions and the later first set of positions, and to receive, by the second sub-network, a second set of feature vectors based on the earlier second set of positions and the later second set of positions.

13. The system of claim 3, wherein the memory further stores a training module including instructions that, when executed by the processor, cause the processor to perform a training operation on the Siamese neural network.

14. The system of claim 13, wherein the first set of information is a training set of information.

15. The system of claim 14, wherein a position of the pose of the camera that produced the first image is based on high-precision proprioception information affiliated with the camera that produced the first image.

16. The system of claim 15, wherein the high-precision proprioception information was produced by a real-time kinematic global navigation satellite system affiliated with the camera that produced the first image.

17. A method, comprising:

receiving, by a processor operating a machine learning technique, information, the information:

including:

positions of points that represent objects in images of a location, semantic information affiliated with the objects, and a pose of a camera that produced the images, but excluding a depiction of any of the objects;

producing, by the processor operating the machine learning technique, results of data association operations for the positions of the points;

producing, by the processor and based on the results, a digital map of the location; and transmitting, by the processor, the digital map to a specific vehicle to be used to control a movement of the specific vehicle.

18. The method of claim 17, wherein:

the receiving comprises receiving, from a set of vehicles, the information, and the pose of the camera comprises a set of poses from a set of cameras.

19. The method of claim 17, further comprising performing, by the processor, a training operation on a neural network associated with the machine learning technique.

20. A non-transitory computer-readable medium for using a machine learning technique to perform data association operations for positions of points that represent objects in images of a location, the non-transitory computer-readable medium including instructions that, when executed by one or more processors, cause the one or more processors to:

receive, while operating the machine learning technique, information, the information:

including:

the positions of the points that represent the objects in the images of the location, semantic information affiliated with the objects, and a pose of a camera that produced the images, but excluding a depiction of any of the objects;

produce, while operating the machine learning technique, results of the data association operations for the positions of the points;

produce, based on the results, a digital map of the location; and transmit the digital map to a specific vehicle to be used to control a movement of the specific vehicle.

* * * * *